US011862987B2

United States Patent
Daga et al.

(10) Patent No.: US 11,862,987 B2
(45) Date of Patent: *Jan. 2, 2024

(54) CONTACTLESS SWAPPABLE BATTERY SYSTEM

(71) Applicant: InductEV, Inc., Malvern, PA (US)

(72) Inventors: Andrew W. Daga, Malvern, PA (US); Francis J. McMahon, Malvern, PA (US); Matthew L. Ward, Exton, PA (US)

(73) Assignee: InductEV Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,153

(22) Filed: Dec. 7, 2022

(65) Prior Publication Data
US 2023/0179026 A1 Jun. 8, 2023

Related U.S. Application Data

(60) Provisional application No. 63/265,084, filed on Dec. 7, 2021.

(51) Int. Cl.
H02J 50/12 (2016.01)
H02J 7/00 (2006.01)
(Continued)

(52) U.S. Cl.
CPC .............. *H02J 50/12* (2016.02); *B60L 50/64* (2019.02); *B60L 53/12* (2019.02); *B60L 53/22* (2019.02);
(Continued)

(58) Field of Classification Search
CPC .......... H02J 50/12; H02J 7/0044; H02J 50/80; B60L 50/64; B60L 53/12; B60L 53/22;
(Continued)

(56) References Cited

U.S. PATENT DOCUMENTS 5,378,555 A 1/1995 Waters et al.
6,496,949 B1 12/2002 Kanevsky et al.
(Continued)

FOREIGN PATENT DOCUMENTS

CN 106427936 B 4/2020
DE 202019101228 U1 6/2019
(Continued)

OTHER PUBLICATIONS

Machine Translation of TW 1568133B (Year: 2021).*
(Continued)

Primary Examiner — M Baye Diao
(74) Attorney, Agent, or Firm — Culhane Meadows PLLC; Michael P. Dunnam

(57) ABSTRACT

A contactless battery system includes a sealable case, a battery unit disposed within the sealable case, and at least one wireless power transmission coupler connected to the battery unit and disposed within the sealable case. The battery unit includes an arrangement of serially connected battery cells in a fixed number of banks of battery cells to deliver a set voltage and current. The wireless power transmission coupler is disposed with respect to at least one face of the sealable case to enable magnetic inductive signaling for charging, discharging, and communication with the battery unit. A battery management controller communicates bidirectionally with the contactless battery systems and with electrically powered equipment to control charging. A distribution system manages distribution of the contactless battery systems to a plurality of depots adapted to store, charge, or exchange depleted contactless battery systems under control of at least one management unit.

21 Claims, 15 Drawing Sheets

(51) Int. Cl.
*H01M 50/24* (2021.01)
*H01M 50/204* (2021.01)
*H01M 50/51* (2021.01)
*H01M 50/512* (2021.01)
*H01M 10/46* (2006.01)
*H01M 10/42* (2006.01)
*B60L 53/22* (2019.01)
*B60L 58/18* (2019.01)
*B60L 53/80* (2019.01)
*B60L 50/64* (2019.01)
*B60L 53/12* (2019.01)
*B60L 53/66* (2019.01)
*H02J 50/80* (2016.01)

(52) U.S. Cl.
CPC ............... *B60L 53/66* (2019.02); *B60L 53/80* (2019.02); *B60L 58/18* (2019.02); *H01M 10/425* (2013.01); *H01M 10/46* (2013.01); *H01M 50/204* (2021.01); *H01M 50/24* (2021.01); *H01M 50/51* (2021.01); *H01M 50/512* (2021.01); *H02J 7/0044* (2013.01); *H02J 50/80* (2016.02); *H01M 2010/4271* (2013.01); *H01M 2010/4278* (2013.01); *H01M 2220/20* (2013.01)

(58) Field of Classification Search
CPC .......... B60L 53/66; B60L 53/80; B60L 58/18; H01M 10/425; H01M 10/46; H01M 50/204; H01M 50/24; H01M 50/51; H01M 50/512; H01M 2010/4271; H01M 2010/4278; H01M 2220/20
USPC ........................................................... 320/108
See application file for complete search history.

(56) References Cited

U.S. PATENT DOCUMENTS

| | | | |
|---|---|---|---|
| 9,112,364 B2 | 8/2015 | Partovi | |
| 9,653,206 B2* | 5/2017 | Keeling | H01F 38/14 |
| 9,787,127 B2* | 10/2017 | Shen | H02J 50/10 |
| 9,876,396 B2* | 1/2018 | Yoshida | H02J 7/0042 |
| 9,991,732 B2* | 6/2018 | Blakely | H02M 1/08 |
| 10,110,030 B1* | 10/2018 | Colosimo | H02J 50/12 |
| 10,615,387 B2* | 4/2020 | Hjorth | B60L 50/64 |
| 10,938,251 B1* | 3/2021 | Mehrabi | H02J 50/90 |
| 11,114,903 B2* | 9/2021 | AbuKhalaf | H04B 5/0037 |
| 11,362,548 B1* | 6/2022 | Ren | H04B 5/0037 |
| 11,489,366 B2* | 11/2022 | Kahlman | H02J 50/80 |
| 2008/0280195 A1 | 11/2008 | Kumar et al. | |
| 2010/0019730 A1 | 1/2010 | Chueh et al. | |
| 2012/0030480 A1* | 2/2012 | Ikeuchi | H04L 9/3271 713/189 |
| 2015/0061581 A1* | 3/2015 | Ben-Shalom | H02J 7/00712 320/108 |
| 2015/0364799 A1* | 12/2015 | Miller | H04B 5/0037 320/108 |
| 2015/0365737 A1* | 12/2015 | Miller | H04B 5/0037 340/870.02 |
| 2016/0094051 A1* | 3/2016 | Soar | H04B 5/0031 307/9.1 |
| 2018/0152042 A1* | 5/2018 | Blakely | H02J 50/20 |
| 2018/0248413 A1* | 8/2018 | Miller | H01M 10/482 |
| 2021/0091436 A1* | 3/2021 | Haring | H01M 50/204 |

FOREIGN PATENT DOCUMENTS

| | | | | |
|---|---|---|---|---|
| TW | I568133 B | * | 1/2021 | ............. B60L 58/22 |
| WO | 1997001207 A1 | | 1/1997 | |

OTHER PUBLICATIONS

International Search Report and Written Opinion received in Patent Cooperation Treaty Application No. PCT/US2020/058319, dated Jan. 28, 2021.

Prabhakar, T.V., et al., "NFC for Pervasive Healthcare Monitoring", 28th International Conference on VLSI Design, Bangalore, India, 2015, pp. 75-80.

* cited by examiner

CONTACTLESS SWAPPABLE BATTERY SYSTEM

CROSS-REFERENCE TO RELATED APPLICATIONS

This application claims the benefit of priority to U.S. Provisional Patent Application No. 63/265,084, filed Dec. 7, 2021, and entitled "CONTACTLESS SWAPPABLE BATTERY SYSTEM," which is hereby incorporated by reference herein in its entirety.

TECHNICAL FIELD

This disclosure describes the construction, use, distribution and servicing of replaceable battery packs using a contactless magnetic induction coupling for charging and discharging.

BACKGROUND

The concept of a replaceable battery has existed since the invention of the electric pile by Alessandro Volta in 1800.

The consumer need for non-proprietary, interchangeable batteries has led to the standardization of volumetric sizes, voltages, and terminals (i.e., contact points). These standards include, for example; The American National Standards Institute (ANSI) standard C18.1M, "National Standard for Portable Primary Cells and Batteries with Aqueous Electrolyte."

Wireless power transmission via magnetic resonance induction was introduced in the $19^{th}$ century A.D. but failed commercially due to a misunderstanding of the atmosphere's ability to form electrically conductive channels. The use of the flat wire coil for magnetic inductance was detailed in U.S. Pat. No. 512,340; "Coil for Electro-Magnets," Issued-Jan. 9, 1894.

As written by Robert A. Heinlein in the 1982 science fiction book, "Friday," "the problem was not a shortage of energy but lay in the transporting of energy. Energy is everywhere—in sunlight, in wind, in mountain streams, in temperature gradients of all sorts wherever found, in coal, in fossil oil, in radioactive ores, in green growing things. Especially in ocean depths and in outer space energy is free for the taking in amounts lavish beyond all human comprehension. Those who spoke of 'energy scarcity' and of 'conserving energy' simply did not understand the situation. The sky was 'raining soup;' what was needed was a bucket in which to carry it." Heinlein's fictional imaging for portable energy storage was called a "Shipstone."

The lithium-ion (Li-ion) battery (in its various configurations and chemistries) has been recognized for its value in energy storage, with the battery inventors receiving the 2019 Nobel Prize for Chemistry. However, use of batteries, including Li-ion, remains problematic for large scale power supply use unlike their fictional counterparts.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

A contactless battery system includes a sealable case, a battery unit disposed within the sealable case, and at least one wireless power transmission coupler connected to the battery unit and disposed within the sealable case. The battery unit includes an arrangement of serially connected battery cells in a fixed number of banks of battery cells to deliver a set voltage and current. The wireless power transmission coupler is disposed with respect to at least one face of the sealable case to enable magnetic inductive signaling for charging, discharging, and communication with the battery unit. A battery management controller communicates bidirectionally with the contactless battery systems and with electrically powered equipment to control charging. A distribution system manages distribution of the contactless battery systems to a plurality of depots adapted to store, charge, or exchange depleted contactless battery systems under control of at least one management unit.

A method may be performed by the apparatus, and further features of the method result from the functionality of the apparatus. Also, the explanations provided for each aspect and its implementation apply equally to the other aspects and the corresponding implementations. The different configurations may be implemented in hardware, software, or any combination thereof. Also, any one of the foregoing examples may be combined with any one or more of the other foregoing examples to create a new configuration within the scope of the present disclosure.

DETAILED DESCRIPTION OF THE DRAWINGS

The foregoing and other beneficial features and advantages of the subject matter described herein will become apparent from the following detailed description in connection with the attached figures, of which:

Figure 8:
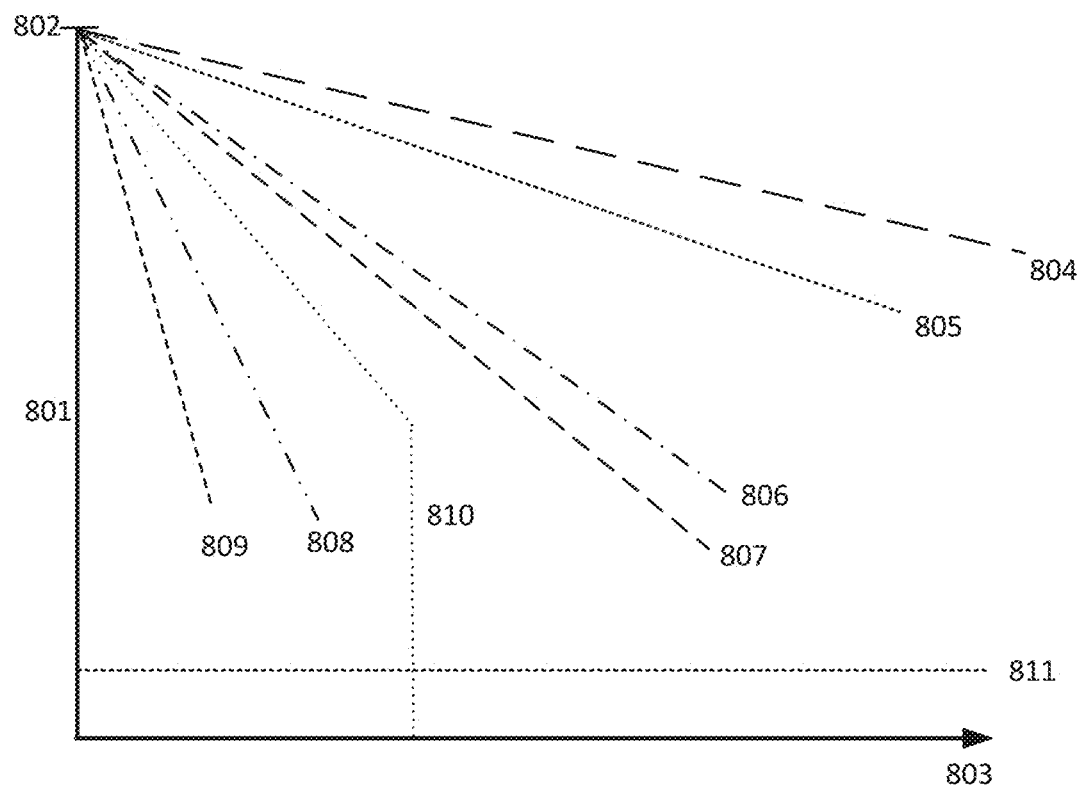

FIG. 8 graphically illustrates an example of a battery life versus use model in sample configurations.

Figure 9:
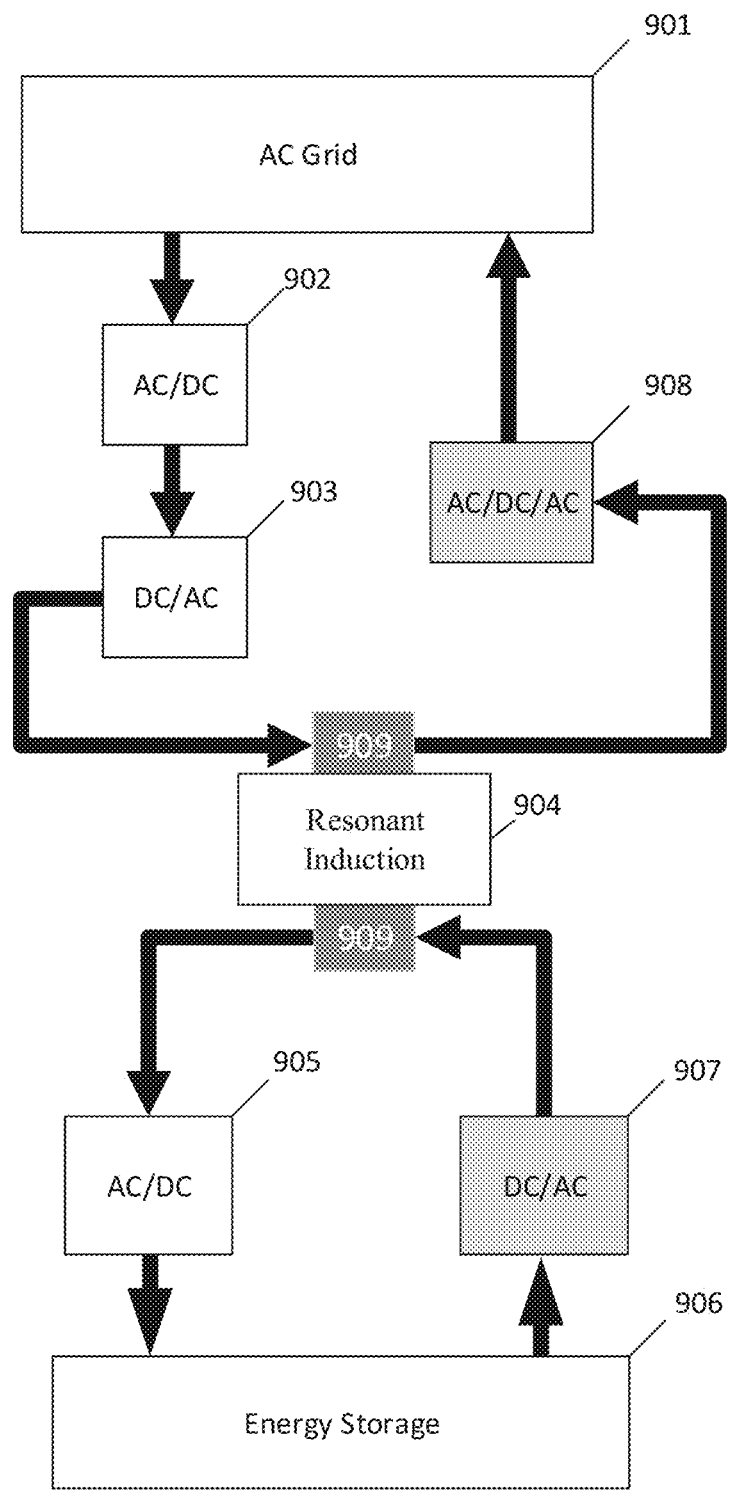

FIG. 9 depicts the functional blocks for providing simplex bi-directional power.

Figure 10:
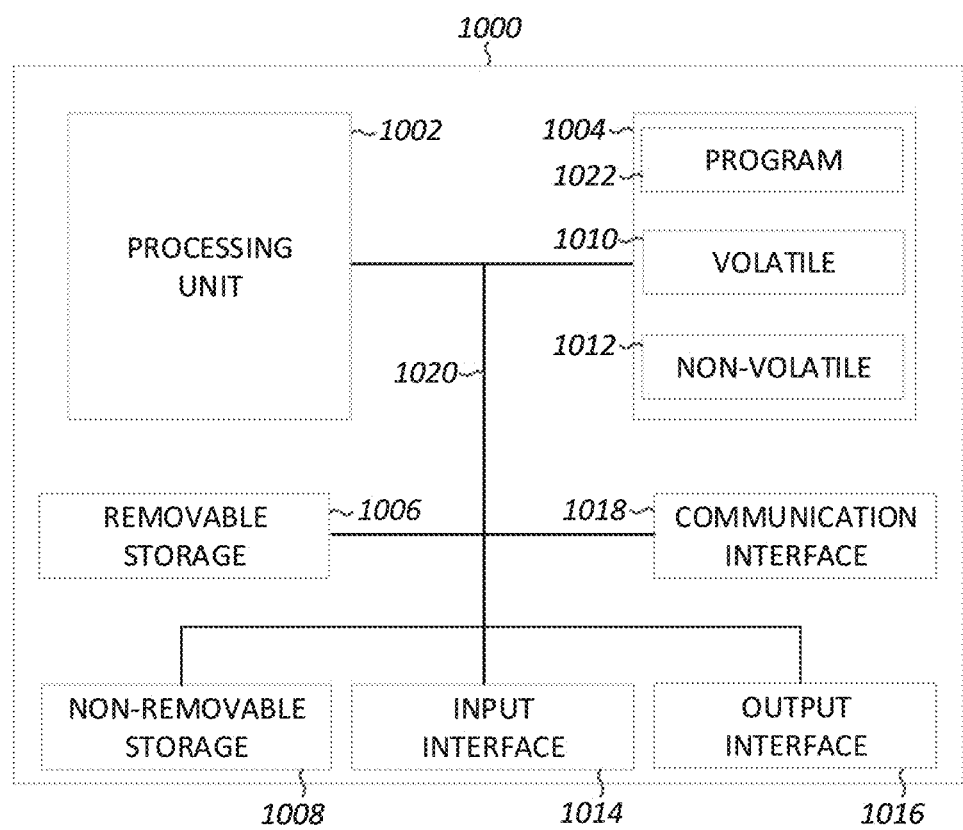

FIG. 10 is a block diagram illustrating circuitry for performing methods and implementing processing features according to example configurations.

Figure 11A:
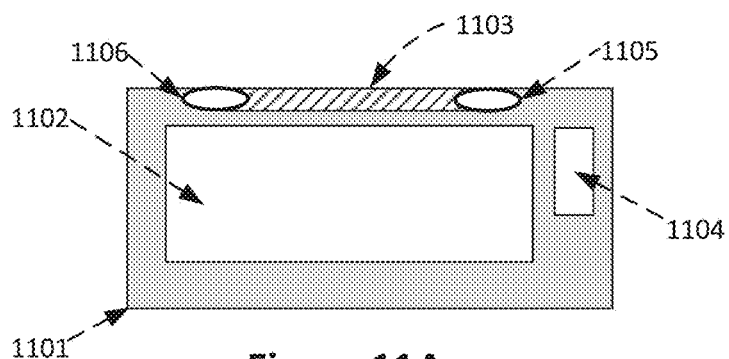

FIG. 11A illustrates a subsystem view of a single voltage contactless swappable battery pack.

Figure 11B:
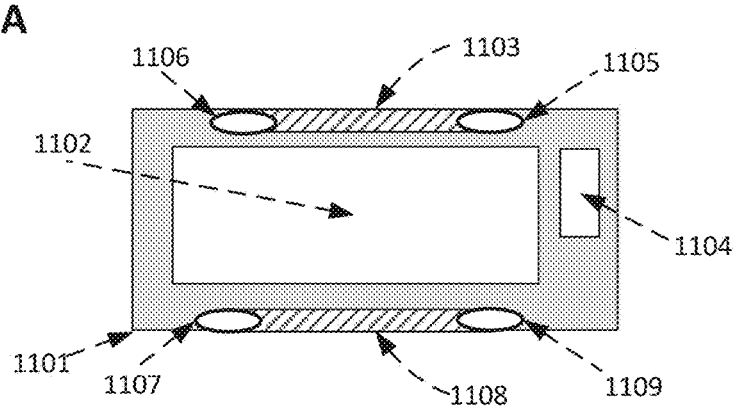

FIG. 11B illustrates a subsystem view of a single voltage dual contactless swappable battery pack.

Figure 11C:
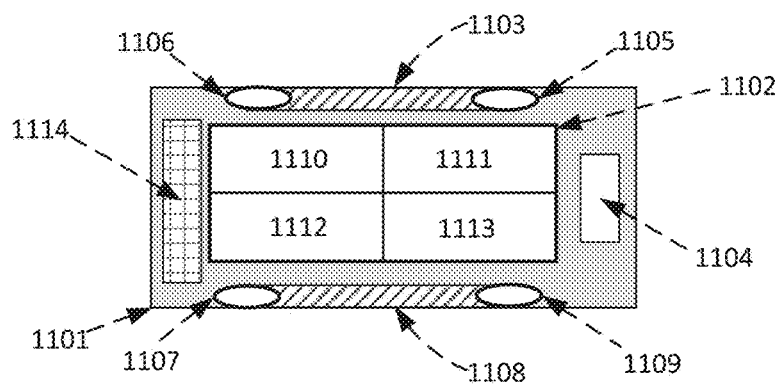

FIG. 11C illustrates a subsystem view of a voltage selectable dual contactless swappable battery pack.

Figure 11D:
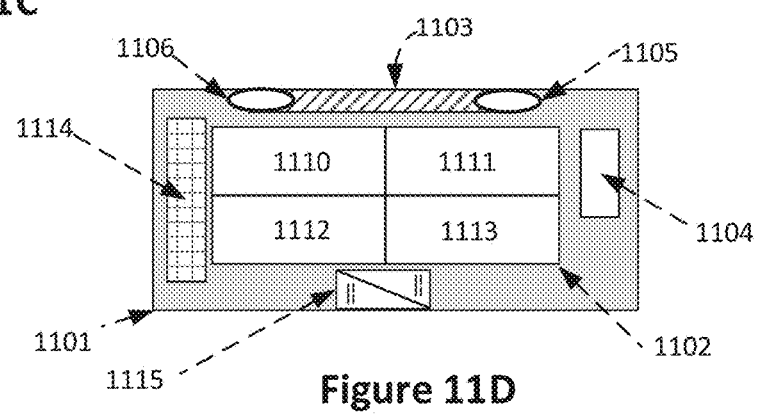

FIG. 11D illustrates a system view of a dynamically selectable contactless swappable battery pack.

Figure 12:
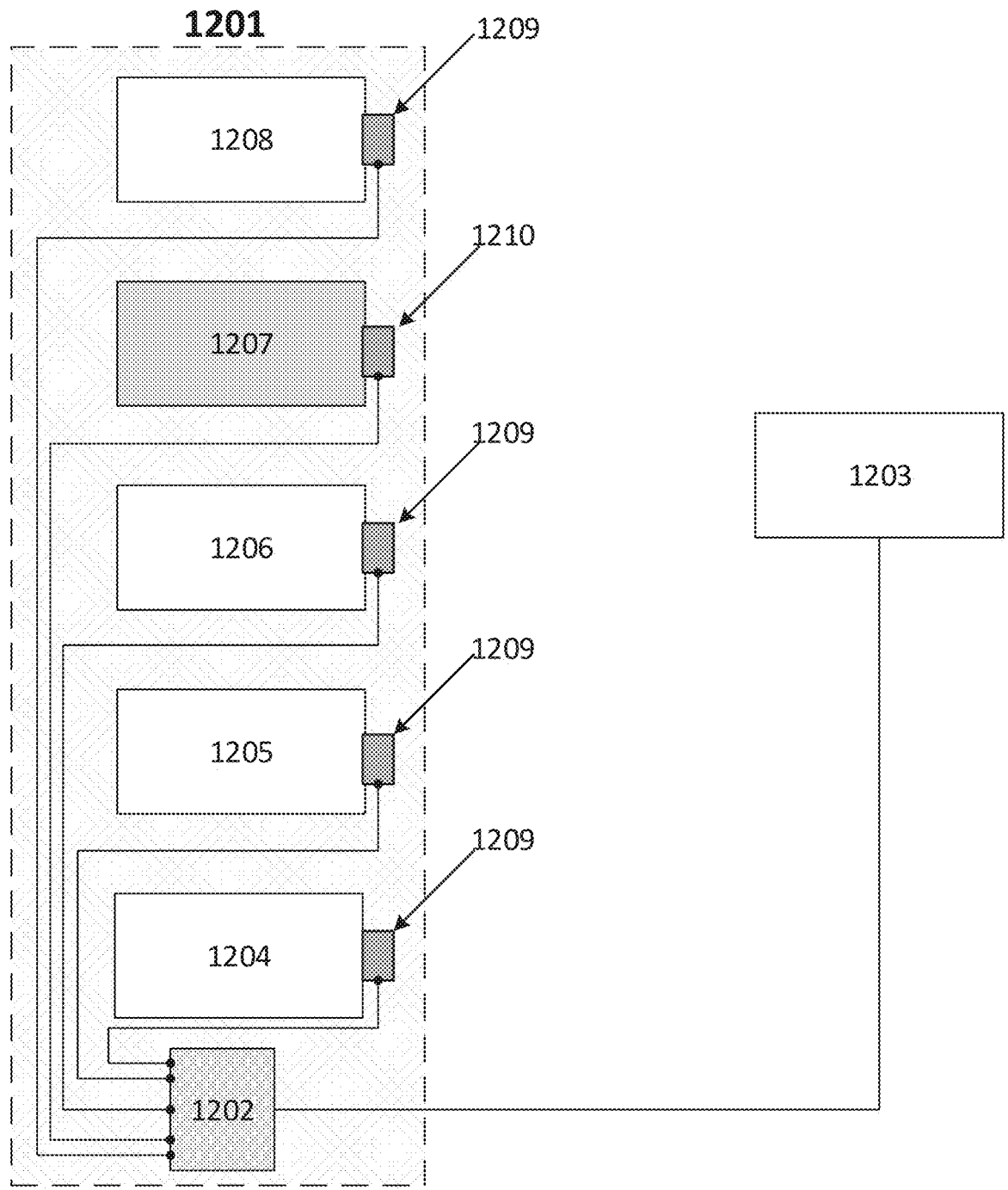

FIG. 12 illustrates the control structures for a contactless swappable battery installation.

Figure 13:
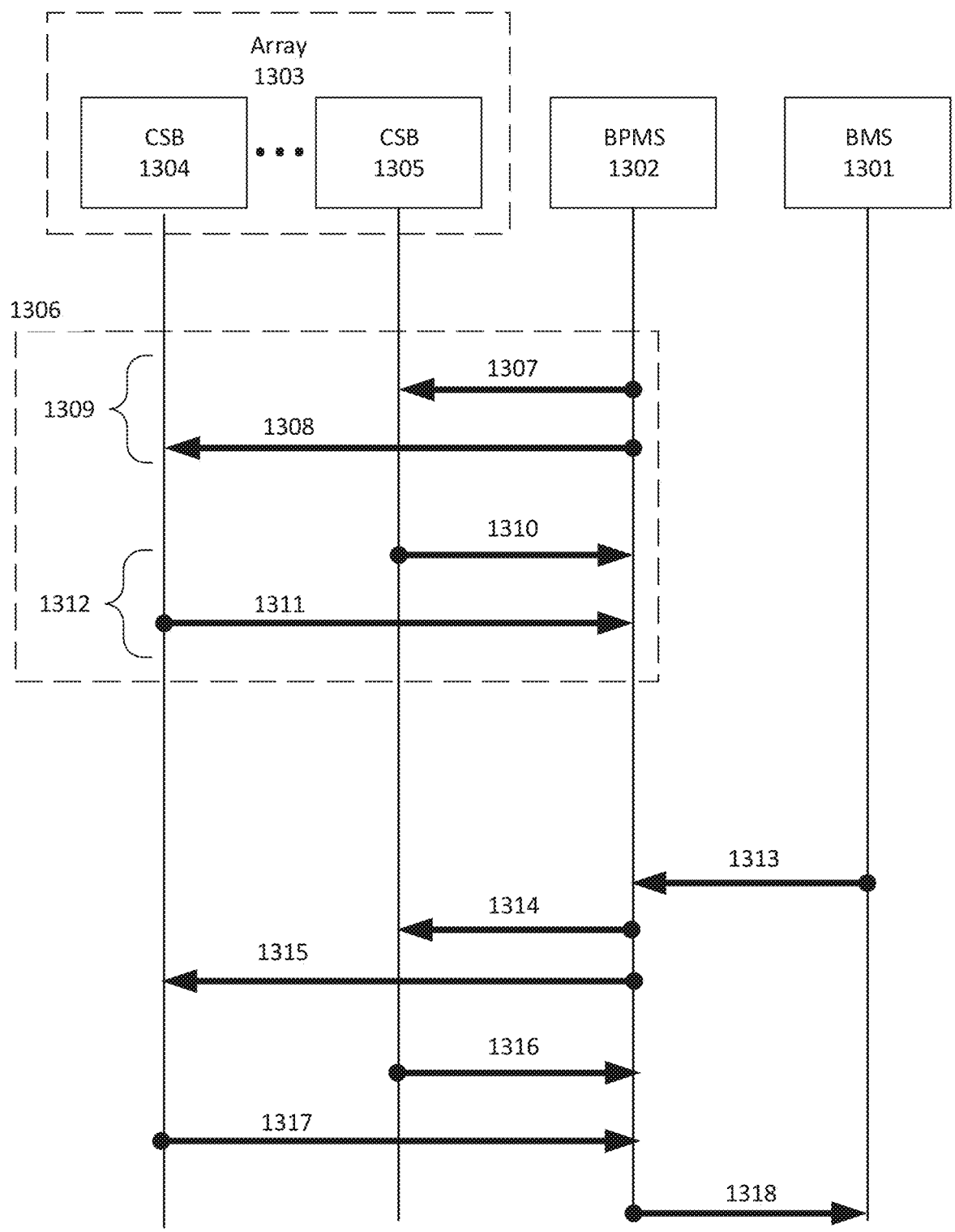

FIG. 13 illustrates the information flows between the major subsystems of a contactless swappable power system in a sample configuration.

Figure 14:
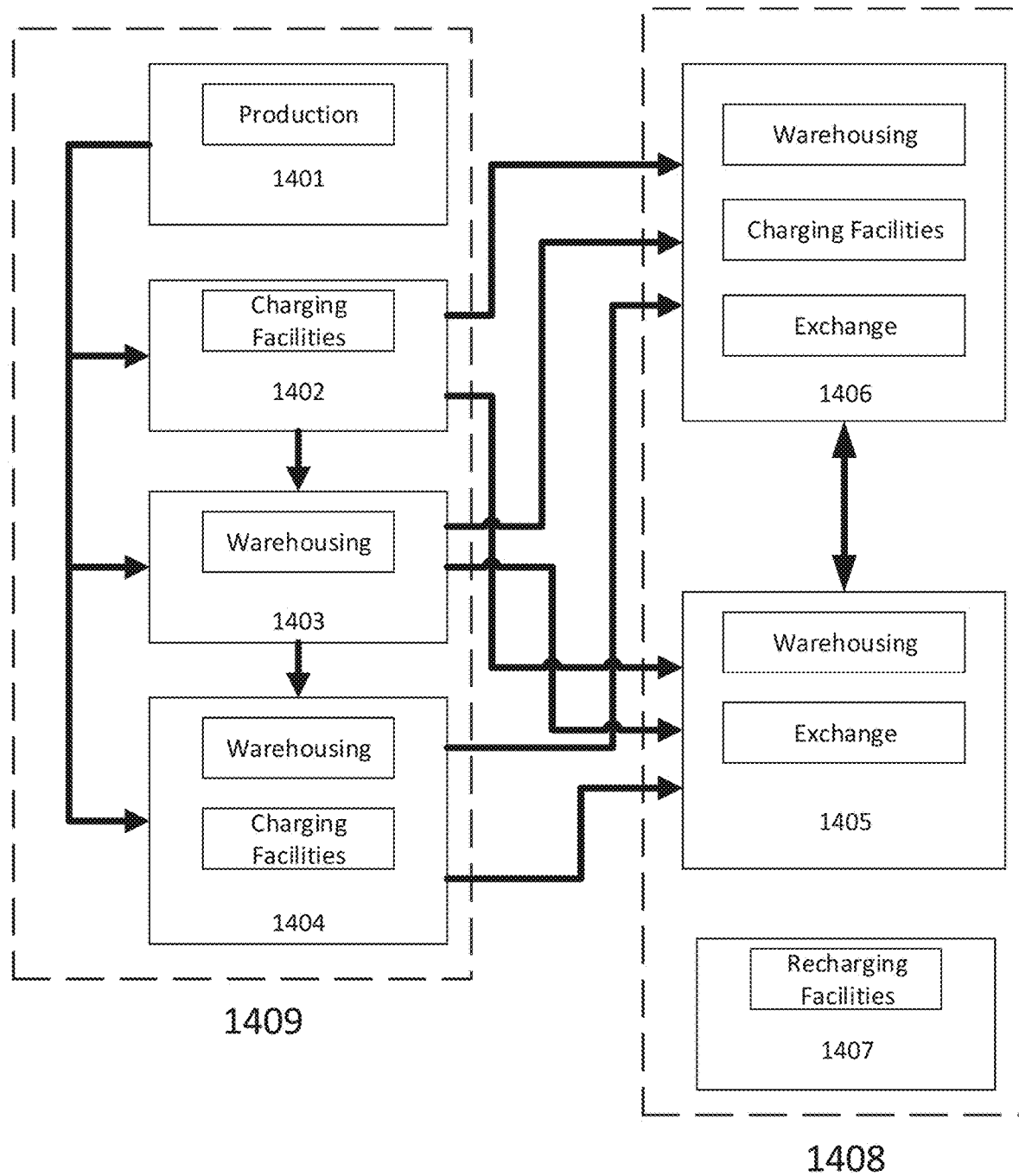

FIG. 14 illustrates an exemplary distribution network for the transport, production, warehousing, pre-positioning, storage, charging, exchange, and replenishing of a delivery system for contactless swappable battery units.

Figure 15:
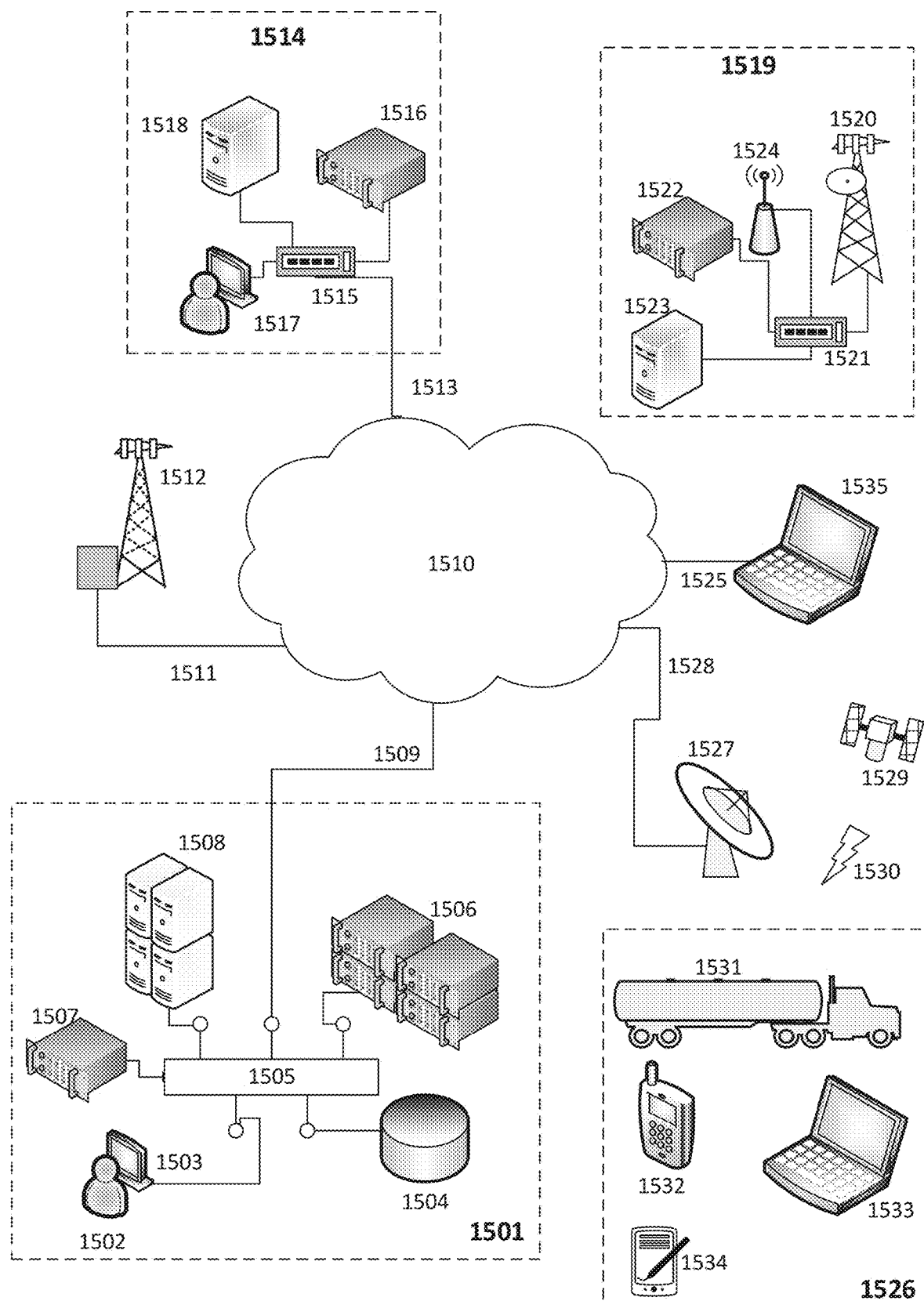

FIG. 15 illustrates an exemplary network for the monitoring and control of physical and informational assets in a battery exchange network.

DETAILED DESCRIPTION OF ILLUSTRATIVE CONFIGURATIONS

Sample configurations will be described with respect to FIGS. 1-15 for use in charging electrically powered vehicles, although those skilled in the art will appreciate that the teachings provided herein may be used in other non-vehicular resonant magnetic induction wireless power transfer systems. Such configurations are intended to be within the scope of the present disclosure.

The contactless replaceable (swappable) battery unit described herein employs magnetic inductive coupling to accomplish charging of, discharging from, and communication between system elements to allow for a contactless battery unit that is permanently sealed in a rugged, dust-proof and water-resistant container.

Without physical contacts, the battery is inherently safe since voltage and current are not available to the touch. The lack of conductive material also means that contact wear is eliminated. The case of the contactless replaceable battery provides the standoff distance between wireless resonance couplers. The battery modules also have the benefit of inherent galvanic isolation due to the contactless nature of the system.

While circuit breakers, interrupts, or fuses may be incorporated within the battery unit housing, the use of wireless power transfer prevents shorts and ground faults in handling even in a conductive atmosphere or in submerged fresh or seawater applications.

The sealed aspect of the battery unit prevents water and dust infiltration allowing for battery use in wet, dusty or explosive atmosphere environments. The sealed aspect also allows the deployment of internal (to the case) intrusion detection systems, both physical and electronic. The intrusion detection can be used to detect improper attempts at battery changes or attacks on the electronics containing the usage and charging records in an attempt to increase the battery unit's value on the secondary life battery market.

In the near term, large scale (multi-kilowatt hour (kWh)) vehicle and ground site deployments are foreseen for the sealed contactless battery unit and charging stations. However, as electronics continue to miniaturize, inclusion of sealed contactless battery units into most or all replaceable battery applications will become possible.

FIG. 1

Figure 1:
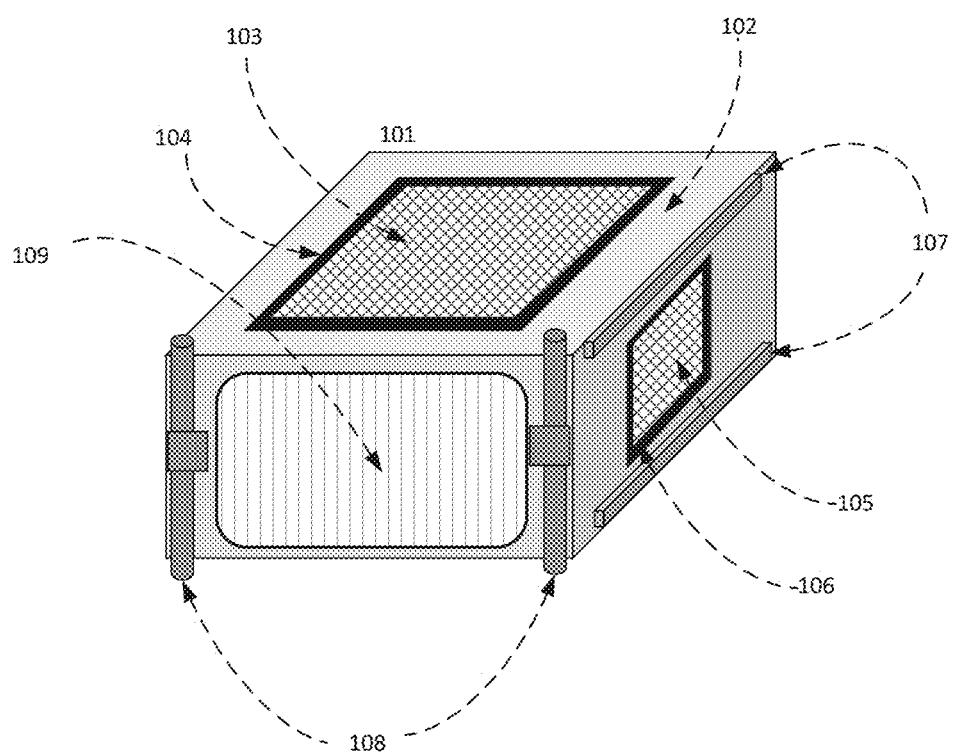
FIG. 1 illustrates an example of a contactless battery unit in a sample configuration.

FIG. 1 illustrates an example of a sealed, contactless battery unit 101 in a sample configuration. A rugged sealed case 102 protects the interior components of the battery unit 101. The material of the sealed case 102 may be a non-conductive material (e.g., fiberglass, Kevlar® composite) or metal. If the case is metal, the areas covering the wireless power transmission (WPT) couplings 103 and 105 and a surrounding guard band 104 and 106 must be non-conductive. Note that in FIG. 1, an additional two wireless power transmission couplers are not shown on other sides of the battery unit 101. Dependent on the voltage, current, or power the battery unit 101 is intended to supply, the number of WPT couplings 103 can vary from 1-to-n*m, where n is the number of flat sides of the sealed case 102 and m is the number of coupler installations per flat side (based on the ratio of available flat side area to coupler area). The geometry of the battery unit 101 may be varied with each additional flat side allowing additional WPT coupler installations. The size the battery unit 101 also may be varied depending on use, thus also allowing additional coupler installations on the available area of each flat surface. The size of the magnetic inductive couplers and coupler surface area may also be varied to obtain the desired number of couplers per battery unit 101.

Each coupler includes one or more flat coil assemblies with associated circuitry (e.g., filter(s), rectifier, voltage converter, voltage regulator) protected under the non-conducting charging surface portion of the battery case. The coupler is bidirectional in that it may be alternately used for charging when recharging and discharging when supplying power.

A holding element 107 is included on each lateral corner of the sealed case 102 of the battery unit 101 as shown in FIG. 1. The holding element 107 serves to both assist replacement (insertion and removal) and to hold the battery unit 101 firmly to minimize lateral vibration while in use or during charging. Although shown in the FIG. 1 example as corner mounted slides to fit the socket receptacle provided slots, other powered or unpowered mechanical elements (e.g. slides, rails, rollers, linear ball and roller bearings (either recirculating and non-recirculating), rack-and-pinon, roller bearing plates, threaded and un-threaded rods) and placement on (or integrated into) the case frame are envisioned to provide easy battery unit replacement and to hold the battery unit 101 in a sufficiently vibration-damped grasp.

A locking retention element 108 may be included on the posterior end(s) of the battery unit 101. The locking retention element 108 secures the battery unit 101 in position for use and charging. The locking retention element 108 also serves as a deterrent to inadvertent or malicious battery unit 101 removal. Portrayed in this example as a modified lock rod assembly, other mechanical, magnetic hydraulic, electromagnetic, and electro-mechanical holding element enabled or actuated constructions are feasible to provide or enable the retention and locking functions.

An environmental control element 109 is shown on a posterior end of the battery unit 101. The environmental control element 109 provides a connectionless interface for internal cooling and/or heating elements of the battery unit 101 to external cooling and/or heating elements available when in use or charging. Note that additional thermally conductive surfaces can be emplaced anywhere on the case not occupied by another element (e.g., the charging surface of the WPT coupler).

In this configuration, the magnetic loop antenna for transmission and reception of inductive duplex communications between the battery unit 101 and a charging or discharging cradle (not shown) share the non-conductive surface areas with the wireless power transmission (WPT) couplers 103 and 105. Dedicated non-conductive surfaces may also be used if differing antenna placement is desired.

FIG. 2

Figure 2:
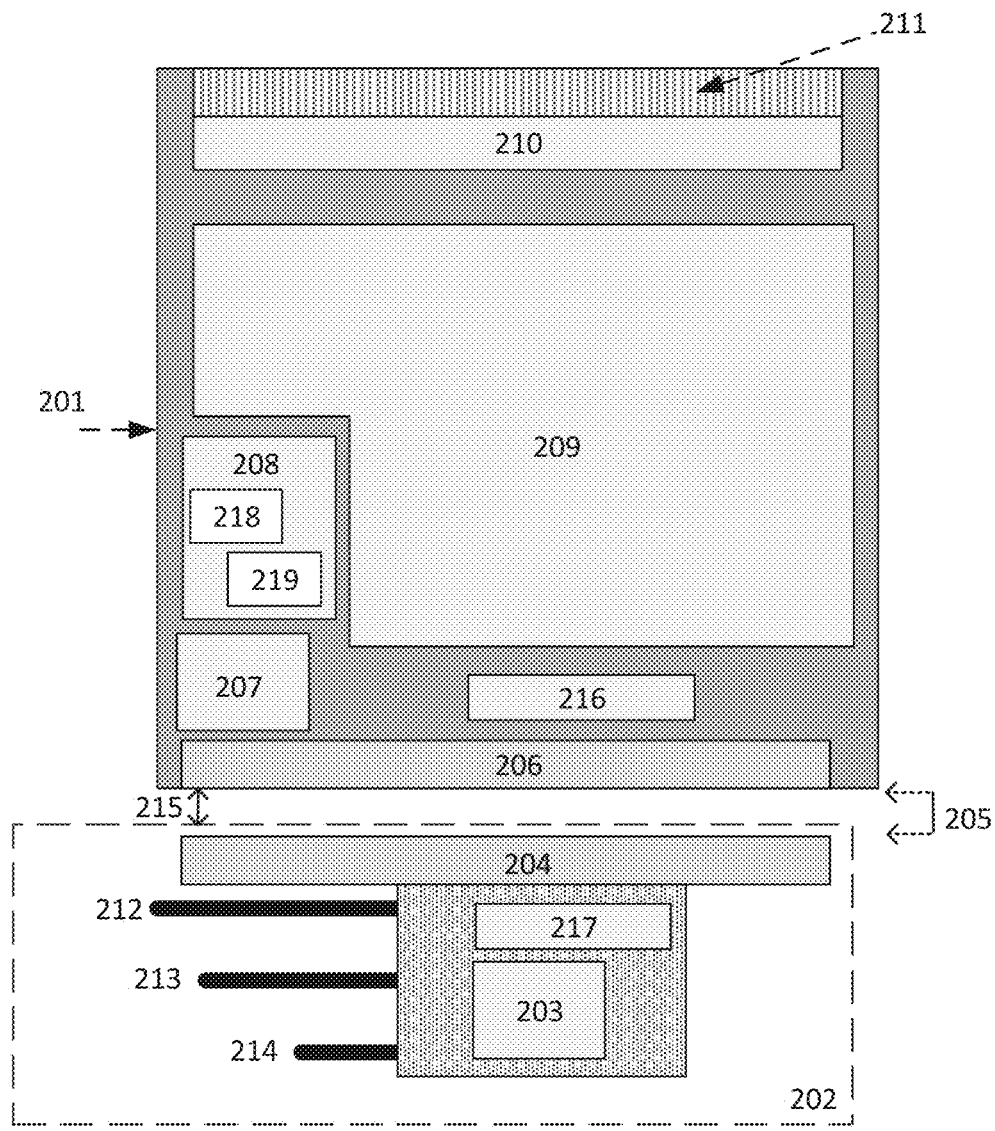
FIG. 2 illustrates the internal functional subsystems of the sealed contactless battery unit as well as a discharge station in a sample configuration.

FIG. 2 illustrates the internal functional subsystems of the sealed contactless battery unit 201 (which may include the battery unit 101 from FIG. 1) as well as a discharge station 202. The battery unit 201 is inserted or otherwise held in place adjacent to the discharge station 202. The gap 205 between battery unit coupler 206 and the discharge station coupler 204 may be regulated by the case thickness or the combined case thickness and discharge station covering. Additional air gap 205 between couplings 204 and 206 may be imposed using standoffs or the holding elements 107 of the battery unit 201.

The discharge station 202 connects with the battery unit 201 using magnetic resonant inductance. In addition to the magnetic discharging signal, an inductively coupled communications system signal also may be present.

The electrical power connection 212 conveys the electricity generated by the discharge station coupling 204 and is conditioned by the power management system 203. The discharge coupling 204 is comprised of one or more flat coil electromagnet(s) and associated circuitry (e.g., filter(s), rectifier, voltage converter-regulator).

The duplex communications link interface 214 between the discharge station 202 and the power station (e.g., a vehicle, a charging cradle, a power storage depot, or a business or residential emplacement) conveys digital information both to and from the battery unit 201 via the inductive communications link 215 to the discharge station 202.

The environmental control connection 213 supplies the desired cooling or heating media to the discharge station 202. Since the battery unit 101 is sealed, radiative surface areas 211 of the battery unit 201 may interface with the supplied heating or cooling via conduction or convective heat transfer. Internal to the battery unit 201 is an environmental control system 210 that serves to manage and distribute the internal coolant resources (e.g., air, liquid coolant, phase change material). The environmental control system 210 provides heating or cooling throughout the battery array 209 and onboard electronics 207 and 208. The battery array 209 consists of distinct cells, each connecting to the power management system 208 and the battery management system 207 and the environmental control system 210. The distinct cells may be chemical cells, capacitive cells (e.g., ultracapacitors), reversable fuel cells or a mixture thereof, creating a hybrid array.

The battery unit communications controller 216 is a gateway router with firewall security, preventing access to the internal network of the battery unit 201 without the appropriate key provided by the discharge station's 202 communication controller 217. The battery unit communications controller 216 also serves to conceal the internal configuration of the battery unit 201 from external probing. Externally available information (e.g., electronic serial number, state of charge, quality score, summarized or publicly available sections of the usage log information) would be retained locally to the battery unit communications controller 216.

The discharge station communications controller 217 is the bridge router between all external networks and the internal WPT enabled communications network. In one configuration, secure internet communications protocols (e.g., Transport Layer Security) are required for any external network connection. Within the internet virtual private networking 'tunnel,' additional authentication and access control using data encryption may be required to access both the discharge station 202 and the battery unit 201.

As illustrated in FIG. 2, the power management system 208 contains a mechanically hardened hardware security module (HSM) 218 and secure memory for logging 219. The secure, encrypted non-volatile memory 219 is used for logging of the secured permanent record of all sensors embedded in the battery unit 201. These sensors include time, temperatures, voltages, currents, pressures, and accelerations. The power management system 208 also serves to limit access to the cryptographic key vault held by the HSM 218.

The power management system 208 may record all communication sessions, physical intrusions, and software access/attack attempts. The power management subsystem 208 includes a communications processor (not shown) that interfaces only to the internal, encrypted secure network of the battery unit 201. All data transferred over the power control subsystem 208 communications link both internal to the battery unit 201 and to and from external sources through the battery unit communications controller 216 is screened by an internal (to the power management system 208) firewall.

Since the battery unit 201 is intended to be permanently sealed, maintenance on the internals of the battery unit 201 is intended to be difficult. Provision for manufacturer-level maintenance (for instance replacement of a malfunctioning battery cell in the battery array 209) is made in that the replacement event will be logged.

Logging of manufacturer-level maintenance of the contactless battery unit will be enabled by the use of cryptographic keys embedded in the key vault. Use of a key will assure that a trusted facility has performed the maintenance. Both symmetric keys and asymmetric (public key) storage may be held in the HSM 218.

The power management system 208 has a battery backup, sized to allow for recording of sensor data before shutdown in the cases of a catastrophic failure like an external software or physical attack or an internal system failure of the battery unit 201.

FIG. 3

Figure 3:
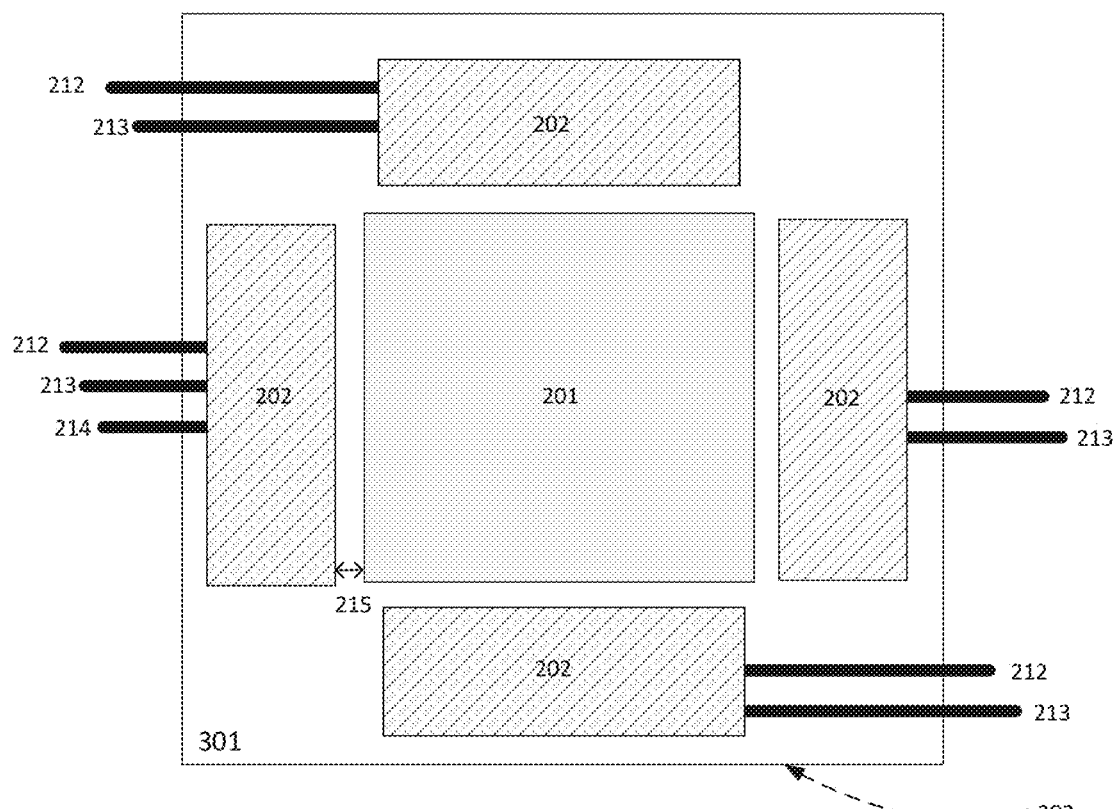
FIG. 3 illustrates a sample configuration of the contactless battery unit in a charging cradle.

FIG. 3 illustrates a sample configuration of the contactless battery unit 201 in a charging cradle. One benefit of the replaceable sealed, contactless battery unit 201 is that it can be charged offsite or while out of the electric vehicle, depending on the use. The offsite location allows access to power and cooling that allows for optimal controllable charging conditions.

The charging station 301 in this example includes a surrounding enclosure 302 that shields and decouples the charging points 202 from the weather. The charging station 301 is supplied with power connections 212 and environmental control (e.g., coolant) connections 213 for each of the charging points 202. This example uses four charging points 202 that connect wirelessly to the battery unit 201. Each of the charging points 202 is independently controllable to optimize the charging voltages. In the charging station configuration of FIG. 3, the external communications link interface 214 is only needed at one charging point 202 for conducting the magnetically coupled duplex communications 215. Additional communications links may be provided for redundancy; otherwise, internal connectivity may be provided to control the various sections.

Since the wired power connections 212, wireless power connections(s) 214 and wireless communications link(s) 215 are bi-directional, a charging station 301 can be used operationally as the discharge station 202 shown in FIG. 2.

Since battery units 201 can be charged at any charging station, potentially owned by different parties, the cryptographic services provided by the battery unit's HSM 218 can be used for data confidentiality, communications integrity, payment non-repudiation, owner identification and charging station 301 and battery unit 201 authentication.

The battery unit 201 may be charged while mounted in the vehicle or at another, off-vehicle site. In one configuration, the charger slowly charges using low voltages so as to lower the cooling and power demands.

In the case of high-power, short duration charging, the charging station 301, however comprised, can supply power and cooling. The power and cooling needs may be generated from the historical, lifetime charging history supplied over the inductive communications system to the charging station 301.

When removed from the vehicle and emplaced into the charging station 301, full or partial submergence in cooling liquid may be used both to regulate the case temperature (and thus the internal battery temperature) but also may be used as an electrical connection to earth ground in architectures where an earth ground is required by the wireless power transfer system and where a section of the sealed battery case may act as a ground contact with the liquid. The permanently sealed case prevents dust and water incursion to meet (or in excess) of NEMA 6 or IP67 requirements.

For non-vehicle primary use, the same charging scenarios (e.g., charging in situ, or removing for off-site charging) apply.

FIG. 4

Figure 4:
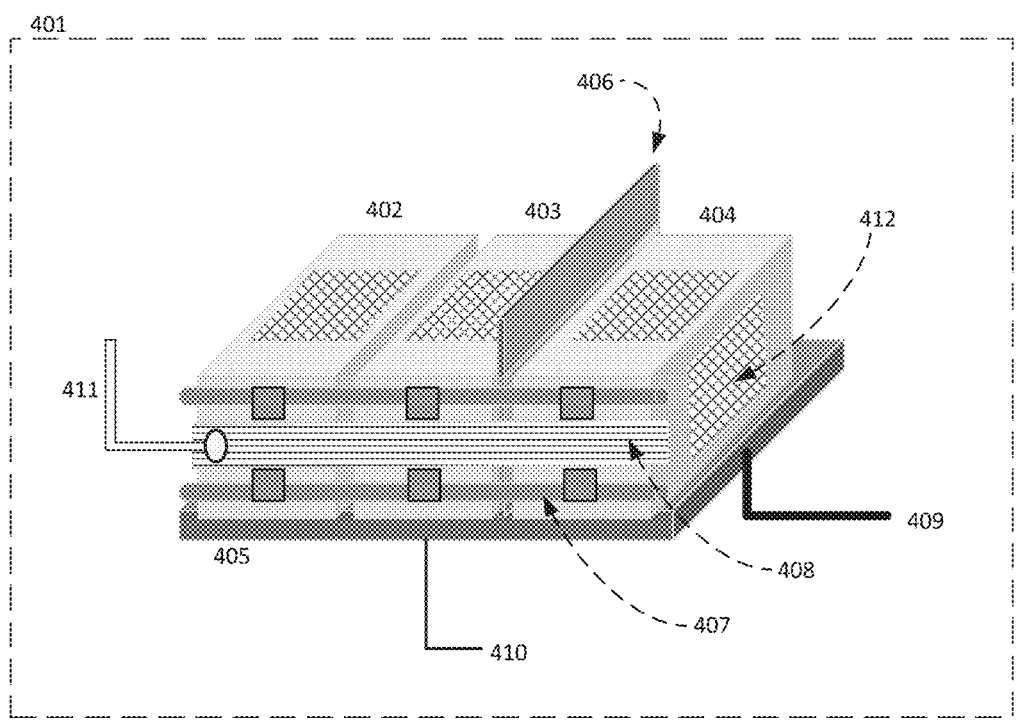
FIG. 4 illustrates an exemplary horizontal cluster arrangement of contactless battery units in a sample configuration.

FIG. 4 illustrates an exemplary horizontal stack of replaceable sealed, contactless battery units 401 in a sample configuration. The battery units 402, 403, and 404 are independently swappable and would commonly be deployed in an n+1 array to maintain power levels during replacement. On the other hand, there may be scenarios where all batteries get replaced while the unit is not functional. In the example of FIG. 4, the discharge station is integral to the bottom tray 405 which also serves to hold the battery units 402, 403, and 404 in place assuring alignment of the bottom coupling units (not shown). In a horizontal arrangement, the side-mounted couplings 412 (note: only one can be seen in the FIG. 4 viewpoint) may be active, distributing power so as to even the power load or capacity of each battery unit 402, 403, and 404. In deployments with vibration or lateral loads (e.g., vehicle movements, earthquakes), the horizontal array 401 may be equipped with vertical supports 406. These vertical supports 406 could also be used to support and stabilize additional rows of battery units 401. Additional rows could interface with lower rows and supply (or be supplied) with power and communications via the aligned bottom to top coupling emplacements. The locking and retention components 407 hold each battery unit 402,403, and 404 in place on the tray 405.

In the portrayed configuration in FIG. 4, a common environmental control interface 411 supplies the battery units 402, 403, and 404 with the needed heating or cooling while a single communications interface 410 provides the connection for exterior communications. A single power connection 409 is used to supply or deliver power depending on the use case. Additional environmental, communication, and power interfaces are deployable as needed (e.g., for cooling, bandwidth, or load respectively). The common environmental exchange component 408 allows for independent connectivity to allow replacement of individual battery units 402, 403, and 404. In some deployments, individual cooling or heating connections to the battery unit 402, 403, and 404 also may be used.

FIG. 5

Figure 5:
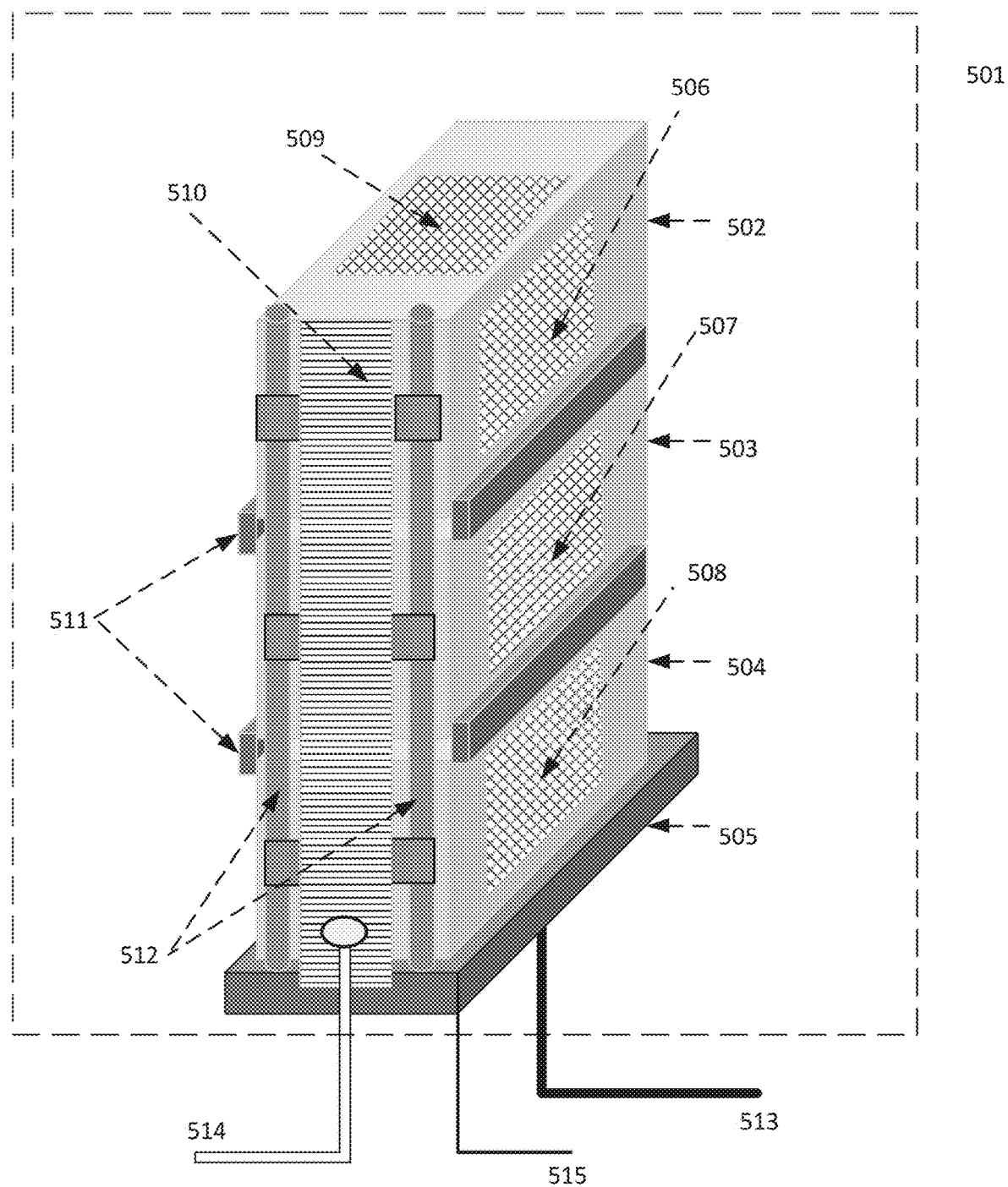
FIG. 5 illustrates an exemplary vertical cluster arrangement of contactless battery units in a sample configuration.

FIG. 5 illustrates an exemplary vertical battery unit array 501 in a sample configuration. The vertical battery unit array 501 shown in FIG. 5 is an example of an interconnected, stacked cluster of independent replaceable sealed, contactless battery units 502, 503, and 504. The battery unit array 501 rests on a bottom tray 505 which provides links to exterior connections for power 513, communications 515, and environmental control 514. A mechanical support system 511 holds the battery units 502, 503, and 504 in place and in proper alignment while a mechanical retention and locking system 512 allows ease of replacement and provides additional mechanical support against movement. An environmental exchange system 510 interfaces with each of the battery units 502, 503, and 504 and allows individual replacement of each battery unit 502, 503, or 504 as well as an exterior environmental connection 514.

The wireless coupling assemblies (not shown) on the tops and bottoms of the lowest battery units 503 and 504 (internal to battery case) allow for communication and power transfer. The topmost battery unit 502 uses its bottom mounted wireless coupling assembly (not shown) for communication and power transfer while its upper wireless coupling assembly 509 is unused and unpowered in this example installation.

The right side-mounted wireless coupling assemblies 506, 507, and 508 are available for interconnection to another vertical stack if desired as are the left side-mounted wireless coupling assemblies (not shown). All wireless coupling assemblies not interconnected will remain unpowered.

FIG. 6a

Figure 6A:
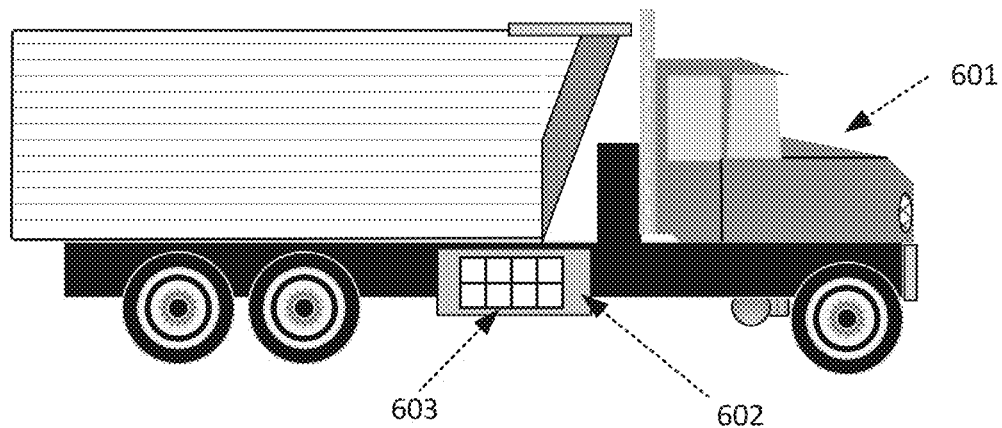
FIG. 6a illustrates a vehicle application of the contactless battery units in a sample configuration.

FIG. 6a illustrates a vehicle application of a cluster of independent replaceable sealed, contactless battery units in an electrically powered construction vehicle 601. The construction vehicle 601 may be a chemical/electrical hybrid. As illustrated, a battery unit socket array 602 is installed on the vehicle (e.g., a dump truck) 601 allowing easy access for loading and unloading of battery units 201. Eight individual sockets 603 are available for insertion of a battery unit in this illustrative example. One or more WPT coupling assemblies may be constructed on each flat side of the socket array 602. In case of a mismatch in assemblies per side on the vehicle socket and the battery unit, only those couplings in geometrical alignment with other battery units or wireless transmission couplers on the vehicle 601 will be enabled for wireless power transfer.

FIG. 6b

Figure 6B:
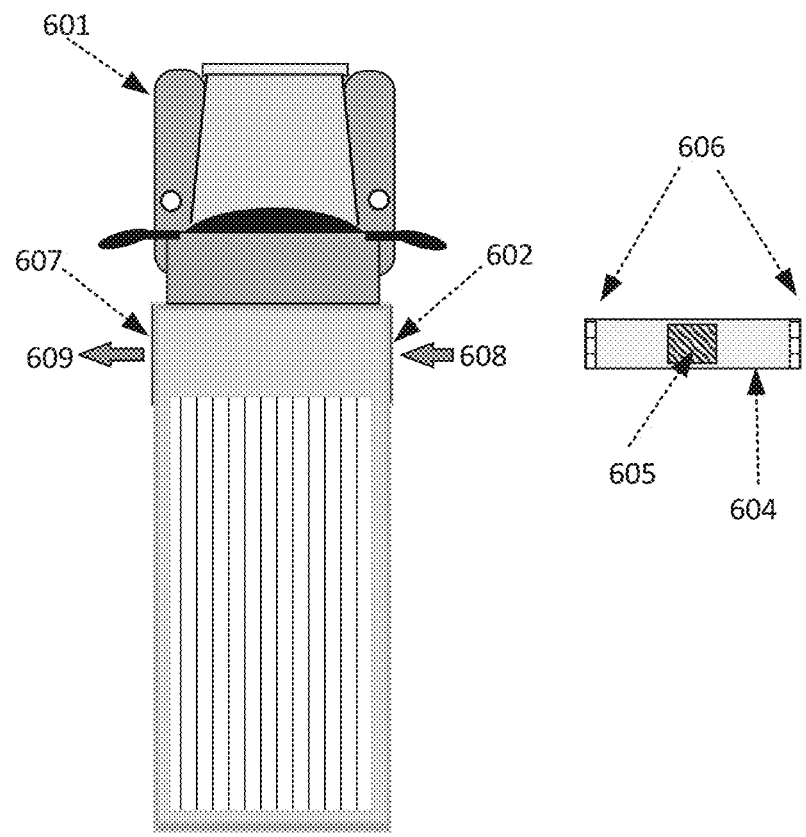
FIG. 6b illustrates a sample configuration of a construction vehicle refueling using contactless battery units in a sample configuration.

FIG. 6b illustrates a sample configuration of a construction vehicle, such as the exemplary dump truck 601 from FIG. 6a, refueling using contactless battery units in a sample configuration. As illustrated, the replacement battery unit 604 has one or more coupling assemblies 605 installed on the flat side(s) of the battery unit 604 for communication of power and data. Environmental interfaces 606 are installed at each end of the replacement battery unit 604 (those not occupied by a wireless coupling assembly).

The battery unit socket array 602 allows easy access to the battery unit socket. In this example, the battery unit socket array 602 is equipped with a secondary access 607. By inserting at 608 a replacement battery unit 604, the previously installed, presumably depleted battery unit is pushed out of the battery socket(s) at 609 via the secondary access 607. The environmental interface in this example relies on ambient air cooling or connections in the hatches of the battery unit socket array 602.

FIG. 7

Figure 7:
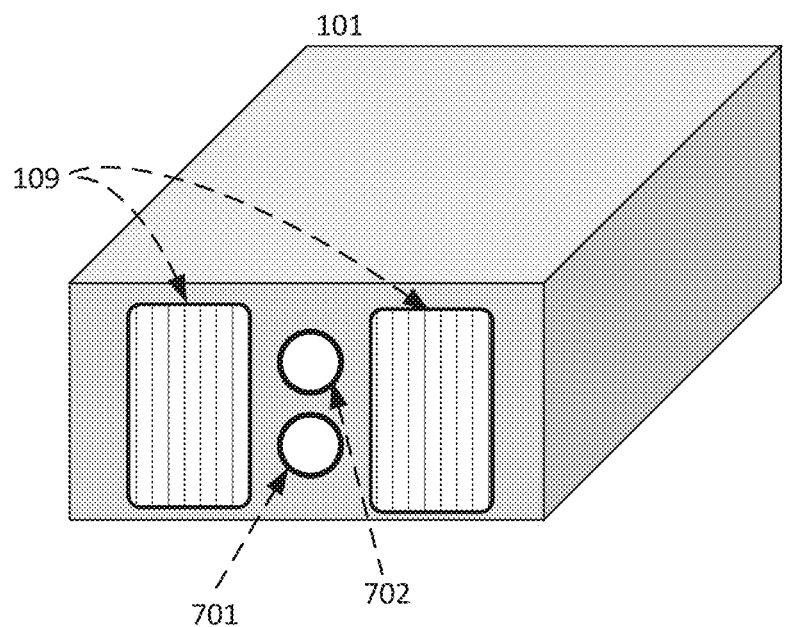
FIG. 7 illustrates a sample configuration of a contactless battery unit configured for handling.

FIG. 7 illustrates a sample configuration of a contactless battery unit configured for handling. FIG. 7 illustrates the customization potential of the sealed contactless battery unit 101. In this example, the battery unit 101 has been equipped with vias 701 and 702 in the body of the battery unit 101 that allow for carriage and installation by lightly modified, conventional handling equipment (e.g., a forklift). The parallel tubular construction through the battery unit's center of mass of the vias 701 and 702 allows for positioning for insertion into a socket without tipping or rolling.

Once installed, the vias through the battery unit also may be reused, providing additional conduction cooling, augmenting other installed environmental control interfaces 109.

FIG. 8

FIG. 8 graphically illustrates an example of a battery life versus use model in sample configurations. Illustrative examples of battery quality models are shown in FIG. 8. The x-axis 803 depicts time while the y-axis 801 shows battery quality 802 as determined from correlation with a detailed, multi-variant model of battery quality. The simplified linear battery life models are shown to illustrate the variables in determining battery quality in a graphical form. A quality threshold 811 is drawn to show the value for which a replaceable sealed battery unit of a particular design becomes valueless. Other thresholds can exist, for instance, where the battery quality becomes unfit for a vehicle-based application. All illustrative examples depict linear relationships over time; however, more accurate models can include differing linear segments (i.e., changes in slope) over time to better match the impact to capacity variance over time.

The simplest case of estimating battery quality is shown for the charged, stored battery unit. Here the temperature of the storage facility is the main determinant of quality with a cooler facility yielding a higher quality estimate 804 than that of a battery unit stored at a higher temperature quality estimate 805.

For simplified models for a normal operating profile (regular, periodic charging without fast charging (overvoltage) or deep discharge), the estimate 806 shows a higher quality due to discharge cycle from 80% state of charge to 20% state of charge while the estimate 807 shows the relative impact of a discharge cycle from 90% to 10% state of charge.

A catastrophic event's effect on a quality model 810 is shown. With this model, a linear decrease in battery quality over time until an event (e.g., internal short circuit, internal open circuit, internal coolant depressurization, high acceleration (impact)) damages the battery unit, leading to an immediate drop in quality.

Quality models showing the effects of fast charging and/or deep depletion are shown by models 808 and 809. The battery unit yielding the model 808 is periodically driven into deep (e.g., <2% current state of charge capacity) and then is charged overnight. The battery unit generating the model 809 is periodically driven into deep (e.g., <2% current state of charge capacity) and then is charged using a fast charger. The relative quality levels show the impact of both the deep depletion and the fast charging effects on the battery array.

Battery Thermal Management

The battery unit 101 supports an internal thermal management system coupled to the sealed exterior case 102. The sealed exterior case 102 may then be in contact with the elements of the vehicle 601 or charging station 301 that supply cooling or heating without penetration of the sealed battery case 102. The battery unit 101 also may have an internal electrical heating system for pre-heating the internal battery array.

Sensors and History

The sealed permanent nature of the battery unit 101 allows for deployment of permanent internal sensors for voltage, current, temperature and kinetic accelerometer(s) that may be used to generate a historical profile of battery use. Information on temperature, voltage levels, current levels, and 3-axis acceleration(s) to the individual cell level can be generated and retained. This historical profile allows predictions to be made regarding the future capabilities of the battery unit 101. These predictions allow for formulation of a valuation on the secondary market for batteries similar to the mileage (odometer reading) of an automobile for used cars.

The permanently sealed contactless battery unit 101 with wireless connections has a lifetime history of storage, charging and discharging events by having instrumentation (voltage, current, internal and exterior temperature(s), acceleration) built permanently into the battery array and the sealed compartment.

A historical usage profile (charging, discharging, voltages, temperatures, storage, accelerations) may be made for each battery unit 101. Acceleration loads that detect rough handling are also considered. This lifetime profile allows a battery unit quality measurement to be formulated. The full history also would be available, including the creation of an "at-a-glance" single numerical figure for quality (similar to the odometer on a used car).

The chronicled information acquired by the battery unit's sensors and stored by the battery back controller can be used to produce a correlation to a charged-once, unused, unstored, undischarged battery model. A battery with a perfect charging history (e.g., freshly produced, ready for first use) would have a correlation of 1 Daga (note: a new unit of measurement). As the battery unit is cycled over time, the value decreases giving the user/owner an estimate of the battery life and the value to the 2nd and 3rd life markets. For an example, a battery with, for example, a rating of 600 millidagas (md) would be moved from the fleet usage pool to a 2nd life application (such as grid augmentation). The 600 md (or 0.600 D) threshold for vehicular use is an example and could vary with market desire, owner preference, and regulatory requirements.

Obviously, overcharging, overheating, and fast discharging that damage a battery would be accounted for in a lower Daga score as a deviation from the model. Accelerometers measuring shock would also contribute to the Daga score. Casement intrusion detection would also contribute to the Daga score computation as would detection of cyber-attacks versus the battery unit controller.

As an item of value, the Daga score would be kept in secure storage in the battery unit 101 and could be uploaded to a network (e.g., internet attached server based) storage when charging in a charging cradle.

Since the battery unit sensor data can be uploaded, it is possible that the usage profile or updates to the usage profile may be generated by aggregating data from a population of deployed battery units rather than by estimation or lab testing. It is noted that different quality models versus usage can exist for each specific rechargeable battery chemistry (e.g. Lead-acid, Nickle-Cadmium (NiCd or Ni-Cad), Nickel-metal hydride (NiMH), Alkaline (predominately Zinc (Zn) and Manganese dioxide ($MnO_2$) based) and the Lithium Ion, Lithium-Sulfur, and Lithium-Polymers (e.g. Li-nickel manganese cobalt oxide (NMC), Li-nickel cobalt aluminum (NCA), Li-iron phosphate (LFP) and Li-titanate (LTO))), solid-state battery, and battery analog (ultracapacitor, reversable fuel cell) and for each hybrid energy storage system where two or more technologies or chemistries are used.

Use of the Daga quality metric could also be used in the place of load testing of a battery unit to generate a snapshot of the battery unit's state of health.

Communications and Control

Magnetic inductive communications (as detailed, for example, in U.S. Pat. No. 10,135,496, entitled "Near field, full duplex data link for use in static and dynamic resonant induction wireless charging" and in U.S. patent application Ser. No. 16/570,801, filed Sep. 13, 2019, also entitled "Near field, full duplex data link for use in static and dynamic resonant induction wireless charging") allow secure and sophisticated communications enabling battery status, state of charge, and historical charging, discharging data to be exchanged as well as closed loop control of the charging signal. The descriptions of these patent documents are hereby incorporated by reference.

Use of alternate or supplemental communications means by the addition to the battery unit of a short-range transceiver (e.g., RFID, Bluetooth, Wi-Fi, or Zigbee) also may be useful in certain deployment configurations or to meet customer or regulatory requirements. Use of longer-range communications means such as cellular radio could also be used if added to the battery unit 101 or discharge cradle 202 for those same reasons.

Bi-Directional Use

The battery's wireless charging unit may be capable of bi-directional use, supporting both charging and discharging of the battery. The wireless charging system may consist of one of more wireless couplers and be reused for discharge. Optionally, separate wireless inductive couplings may be used for charging and discharging with each sized for the expected power transfer rate.

FIG. 9

FIG. 9 shows an exemplary high-level functional diagram for power flow through and conversion by a bidirectional wireless power transfer system in a sample configuration. While certain components are by nature bi-directional and symmetric in operation (e.g., the resonant induction circuit also known as an the open core transformer) and can be shared, the forward (charging) and reverse (discharging) power transmission paths will depend on divergent simplex architectures, requiring switches 909, control logic (not shown), and communications link (also not shown) to activate and complete the power transmission paths for each of the forward (charging) and reverse (discharging) use scenarios.

In the forward direction, power is nominally delivered from the utility grid 901. Dependent on the grid connection, the power may be single phase alternating current (AC), direct current (DC), or multi-phase alternating current. The utility grid 901 includes any transformers needed to step down voltages from high voltage transmission lines. In this example, single phase AC is delivered by the utility grid 901, where a sufficient capacitance exists so that the power factor is adjusted to approximately 1 (unity).

The AC power may be converted to DC by the AC/DC 902 converter. This function can be achieved by an active (switch-based) or passive (diode-based) rectifier.

The DC/AC converter 903 takes the input DC power and converts it to a high frequency AC (nominally 85 kHz in this configuration) sinusoidal signal. The DC/AC conversion operation by the DC/AC converter 903 can be accomplished using an inverter.

The AC power signal may be passed to the coupling, a resonant air core transformer 904, with its primary and secondary coils. The AC power is converted to magnetic flux in the primary which is inductively coupled with the secondary. The secondary coil converts the received magnetic flux into an AC power signal.

The AC power signal is passed to an AC/DC converter 905. The AC/DC conversion function can be achieved by an active (switch-based) or passive (diode-based) rectifier.

The resultant DC signal is used to charge the energy storage device 906, nominally a rechargeable chemical battery, but also could be a one or more of a capacitor bank, reversable fuel cell, solid state battery or a hybrid combination of the aforementioned. The DC signal can also be used to power an electrical device directly.

Being bidirectional, the energy storage device 906 can output stored power as direct current to the reverse transmission path. The DC power is converted by the DC/AC inverter 907 to the necessary AC power signal.

This AC power signal is input into the resonant induction circuit 904. In this reverse path scenario, the coils are reversed in operation from the forward path. The AC power is converted to magnetic flux in the primary coil of the open core transformer 904 which is inductively coupled with the secondary coil. The secondary coil converts the received magnetic flux into an AC power signal. The resultant AC power is adjusted in frequency by the AC/AC converter 908. In one configuration, an AC/DC/AC converter is used as the AC/AC converter 908, where the AC/AC frequency adjustment operation is accomplished using an AC/DC rectifier and then converted from DC to AC at the required frequency by an inverter circuit. The utility grid 901 in this example includes the necessary transformers to translate the AC power to the desired voltage and AC/DC conversion, if necessary, for interfacing with utility supplied power.

FIG. 10

FIG. 10 is a block diagram illustrating circuitry for performing methods and implementing processing features according to example configurations. For example, the processing circuitry of FIG. 10 may be used to implement the cryptographic processing functions of the communications controller, the thermal and power management functions, the intrusion detection functions, and the management of the historical usage profiles and quality models. All components need not be used in various configurations.

FIG. 10 illustrates one example of a computing device in the form of a computer 1000 that may include a processing unit 1002, memory 1004, removable storage 1006, and non-removable storage 1008. Although the example computing device is illustrated and described as computer 1000, the computing device may be in different forms in different configurations. For example, the computing device may instead be a smartphone, a tablet, smartwatch, or other computing device including the same or similar elements as illustrated and described with regard to FIG. 10. Devices, such as smartphones, tablets, and smartwatches, are generally collectively referred to as mobile devices or user equipment. Further, although the various data storage elements are illustrated as part of the computer 1000, the storage may also or alternatively include cloud-based storage accessible via a network, such as the Internet or server-based storage.

Memory 1004 may include volatile memory 1010 and non-volatile memory 1012. Computer 1000 also may include, or have access to a computing environment that includes, a variety of computer-readable media, such as volatile memory 1010 and non-volatile memory 1012, removable storage 1006 and non-removable storage 1008. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1000 may further include or have access to a computing environment that includes input interface 1014, output interface 1016, and a communication interface 1018. Output interface 1016 may include a display device, such as a touchscreen, that also may serve as an input device. The input interface 1014 may include one or more of a touchscreen, touchpad, mouse, keyboard, camera, one or more device-specific buttons, one or more sensors integrated within or coupled via wired or wireless data connections to the computer 1000, and other input devices.

The computer 1000 may operate in a networked environment using communication interface 1018 to connect to one or more remote computers. The remote computer may include a personal computer (PC), server, router, network PC, a peer device or other common network switch, or the like. The communication connection accessed via communication interface 1018 may include a Local Area Network (LAN), a Wide Area Network (WAN), cellular, Wi-Fi, Bluetooth, Zigbee, or other networks. According to one configuration, the various components of computer 1000 are connected with a system bus 1020.

Computer-readable instructions stored on a computer-readable medium are executable by the processing unit 1002 of the computer 1000, such as a program 1022. The program 1022 in some configurations comprises software that, when executed by the processing unit 1002, performs operations according to any of the configurations included herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 1022 may be used to cause processing unit 1002 to perform one or more methods or functions described herein.

It should be further understood that software including one or more computer-executable instructions that facilitate processing and operations as described above with reference to any one or all of steps of the disclosure may be installed in and sold with one or more of the battery units or discharge units described herein. Alternatively, the software may be obtained and loaded into one or more battery units or discharge units in a manner consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the above description or illustrated in the drawings. The configurations herein are capable of other configurations, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The components of the illustrative devices, systems and methods employed in accordance with the illustrated configurations may be implemented, at least in part, in digital electronic circuitry, analog electronic circuitry, or in computer hardware, firmware, software, or in combinations of them. These components also may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the systems and methods described herein may be easily construed as within the scope of the disclosure by programmers skilled in the art to which the present disclosure pertains. Method steps associated with the illustrative configurations may be performed by one or more programmable processors executing a computer program, code or instructions to perform functions (e.g., by operating on input data and generating an output). Method steps may also be performed by, and apparatus may be implemented as, special purpose logic circuitry, e.g., an FPGA (field programmable gate array) or an ASIC, for example.

The various illustrative logical blocks, modules, and circuits described in connection with the configurations disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, compact disc ROM (CD-ROM), or digital versatile disc ROM (DVD-ROM). The processor and the memory may be supplemented by, or incorporated in, special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art may further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. A software module may reside in random access memory (RAM), flash memory, ROM, EPROM, EEPROM, registers, hard disk, a removable disk, a CD-ROM, or any other form of storage medium known in the art. A sample storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., EEPROM), and any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, which is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Alternative Configurations
External Cooling/Heating Supply

Depending on the power load, charging load, external ambient temperature and/or battery chemistry, environmental couplers may need to be added to the contactless battery unit for the use of forced air or liquid coolants from an external supply. While the sealed case provides contact surfaces for cooling by conduction and convective means, connection ports allowing limited access to the battery pack may be needed. While this installation type complicates the replacement of a battery unit, the segregation of the battery unit's internal cooling system would limit access to the rest of the sealed battery unit. The environmental control electronics with its temperature sensor network would be supplemented with the addition of pressure sensors in those contactless battery units designed to allow the ingress and egress of coolants via air or liquid valved connection ports.

In some deployments, external heating of contactless battery units via use of heated forced air or liquid coolants would be similarly equipped and monitored.

Fuel Cell Use

The contactless replaceable battery unit 101 described herein could be used with fuel cells in place of chemical batteries. Offboard fueling would provide the same warehousing and safe charging of potentially hazardous fuels and oxidizers. The contactless design would provide the same lack of electrical contacts. The fuel and oxidizer inputs would by necessity compromise the sealed case but would be opened for replenishment. The replenishment facility could be sited away from the use site, granting more protection to the driver and passengers when used in a vehicle or for those nearby in non-vehicle use.

Supplied Voltage
FIG. 11

FIGS. 11A, 11B, 11C, and 11D all show the high-level construction of a contactless battery pack with differing options.

FIG. 11A illustrates the simplest design with the contactless battery case 1101, the battery payload 1102, the WPT inductive coil assembly 1103, the battery pack controller 1104, the inductive receiver antenna 1105 and the inductive transmission antenna 1106. The contactless battery case 1101 serves to galvanically isolate and protect the electronics and batteries within. The battery payload 1102, in this example, is an arrangement of serial cells in a fixed number of parallel banks to deliver a set voltage and current capacity.

FIG. 11B illustrates an example of a contactless swappable battery capable of sharing current capacity through a second WPT inductive power transfer coil 1108. A second transmission antenna 1107 and a second receiver antenna 1109 are also included in this design.

FIG. 11C illustrates an example of a contactless battery pack with two coil assemblies 1103 and 1108 each with transmission antenna 1106 and 1107 and reception antenna 1105 and 1109. In this example, battery cells are wired serially to produce banks 1110, 1111, 1112, and 1113 which then can be joined in serial or parallel fashion using the switching matrix circuitry 1114.

FIG. 11D illustrates an example of a contactless battery pack with a single inductive coil assembly 1103 that is used for power transfer with a single set of inductive receiver antenna 1105 and transmitter antenna 1106. The battery cells are connected serially in banks 1110, 1111, 1112, and 1113 which can be combined using the switch matrix 1114. A DC/DC converter 1115 allows output voltage level adjustment from the switched battery banks.

Battery Pack Management System (BPMS)
FIG. 12

FIG. 12 illustrates a high-level view of an installation 1201 of contactless swappable battery packs under control of the Battery Pack Management System (BPMS) 1202 which communicates with the Battery Management System 1203 of the served vehicle, building, or other electrically powered equipment. In the FIG. 12 example, the installation

1201 comprises a battery pack rack that holds slots (discharge cradles) for 5 contactless swappable battery packs 1204, 1205, 1206, and 1208. Each slot has electrical bus and cooling connections which are not shown for the purposes of clarity. Each slot is equipped with an inductive communications transmit and receive antenna that communicates with corresponding antenna of the contactless swappable battery pack. Using the inductive communications interface 1209, the BPMS 1202 can communicate bidirectionally with each (if present) contactless swappable battery pack 1204, 1205, 1206, 1207, and 1208. In this example, an inactive communications interface 1210 is present due to the empty battery pack slot 1207.

In this example configuration, the BPMS 1202 communicates bidirectionally with the battery management system 1203 over a wired link to control the charging operation, although a wireless link also could be used.

Configuration Information Flow

FIG. 13

FIG. 13 illustrates the information flows between the major subsystems of a contactless swappable power system. In some configurations, these information flows may be adapted from, or extensions to, existing standardized messaging for corded or wireless charger systems (e.g., ISO 15118, SAE J2847).

The control and coordination of multiple contactless swappable battery packs requires extensive additions in function to a conventional battery management system (BMS) 1301. In the FIG. 13 configuration, these additional functions and capabilities are shown concentrated in the Battery Pack Management System (BPMS) 1302 which bridges the information flow between the vehicle's BMS 1301 and the Contactless Swappable Battery (CSB) pack array 1303.

In the FIG. 13 configuration, the CSB array 1303 contains a first CSB 1304 and a second CSB 1305. The CSB array 1303 may include battery packs sufficient for delivery of the intended power and duration and may also include additional standby CSBs for handling of unexpected power needs, to maintain power levels during swapping (hot swapping), or as a backup. Some CSB array 1303 slots may on occasion be left empty.

As a periodic background task 1306, when a CSB is added to the array 1303, or as commanded, the BPMS 1302 will initiate and exchange interrogation messaging 1306. During interrogation 1306, the BPMS 1302 will initiate a query 1307 to the second CSB 1305 and second query 1308 to the first CSB 1304. The first query 1307 may include an identity request, an authentication challenge, and a health, status, and capabilities request as may the second query 1308. These query requests can occur in any order and at any time. Alarming (where the CSB 1304 and 1305 or the CSB array 1303 updates its status without a BPMS 1302 request), heartbeat, and time synchronization messages are not shown.

A queried CSB 1304 or 1305 may respond at 1312 with stored values, calculated values (e.g., a cryptographic challenge response), or initiate a built-in test to determine the health of the battery cells and the performance capabilities of the first CSB 1304 and second CSB 1305 in the CSB array 1303. The responses 1310 and 1311 may occur in any order.

When the BMS 1301 requests at 1313 that a power (i.e., voltage and current) level be delivered, that information is passed to the BPMS 1302 which then commands at 1314 and 1315 the individual CSBs 1304 and 1305 present in the CSB array 1303 to configure (or reconfigure) to deliver their portion of the commanded power level. Each CSB 1304 and 1305 will respond at 1316 and 1317 when power levels are set. The BPMS 1302 will collect all responses 1316 and 1317 and will signal the BMS 1301 when power is available using a response 1318 to the original power request 1313. The response 1318 may also include a state-of-charge (SoC), run-time estimate, or power capacity (e.g., kilowatts per hour) estimates.

Supported Illustrative Scenarios

SCENARIO 1: Initialization, capacity, use, and drain compensation

In an exemplary scenario, a single CSB contains 100 lithium-ion cells at 2000 milliamp-hours per cell. The lithium-ion battery can range from 4.2 volts per cell to 3.0 volts at cutoff. 10 CSBs are equipped in this example.

The Battery Pack Management Controller (BPMC) receives a request for 100 volts at 10 amps. Under control of the BPMS, the individual CSB switch matrix (e.g., switch matrix 1114 in FIGS. 11C and 11D) may reconfigure the series/parallel relationships of series and parallel banks of cells within the CSB. In this example, the BPMS polls the individual CSBs to find the state of charge (SoC) in the configuration. Battery cell age and temperature also are also considered.

Using an SoC of 3.5 volts per cell, the CSBs are arranged in banks of 3 with 33 parallel banks for an output voltage of 10.5 volts. Each parallel bank of cells can supply 6 Amp-Hours. At 10 Amps, each bank must supply 303 milliamps. The DC/DC converter of each CSB may be used to level the output voltage to 10 volts. Efficiency of the DC/DC converter is assumed to be 80%, so the expected current draw is factored to expect 12A, or 363 milliamps per bank.

The efficiency of the 1:1 open core transformer at resonance is assumed to be 95%, raising the current needed to 12.6 Amps. This efficiency includes the inverter and rectification stages. Since 10 independent CSBs supply the current, 1.26 A will need to be supplied by each CSB. With each CSB having 33 banks of 3 cells each, 382 milliamps will be required per bank. Using this calculation, the BPMC can report 5 hours of power available.

As operation continues, the voltage supplied by each cell will decrease. The DC/DC conversion will be adjusted to return the CSB output to 10 volts.

Alternately, as described in the commonly owned U.S. Pat. No. 9,754,717, issued Sep. 5, 2017, the WPT system can supply the needed voltage adjustment using a reactance generator to adjust the amplitude of the generated magnetic wave and thus the output power.

SCENARIO 2: Battery Pack Failure.

Battery Pack failure calls for immediate replacement. In a multi-pack environment, the additional remaining packs may optionally provide uniform voltage (Vout) albeit at a lower current. For example, it is assumed that a 3-pack system has a catastrophic failure of one pack. In one option, the remaining two packs will continue to supply Vout giving the load 2/3 the total current via their own inductive links. The failed battery pack is galvanically isolated by the disabled inductive power link.

Alternately, if both current and voltage levels need to be maintained, the remaining battery packs can boost output using the inter-battery pack communications to coordinate outputs to maintain total output power. Here, additional limitations may exist to prevent side-effects, such as thermal damage or battery-lifespan depletion (for instance through excessive current draw and thermal effects). Thresholds and rules for abiding these limitations are kept by the Battery Pack Management Controller (BPMC) 1302.

SCENARIO 3: Battery Cell Failure in One Battery Pack

This scenario assumes successful isolation of the failed battery cell within the battery pack, otherwise scenario 2 applies. In this case, the battery pack DC/DC converter is reconfigured to continue to send the same voltage to the inductive coil allowing the battery pack to continue to supply power to match its peer packs (in a multipack system) or required power load.

The battery pack can then be exchanged at a depot. It may be repaired or decommissioned. Alternately, the battery pack can be derated, recharged and offered for lower capacity or lower voltage uses. The derating may include a slower recharge rate with limits on charging voltage, charging current, or both.

SCENARIO 4: Mid-Life Capacity Drop

As battery packs age, the capacity decreases and can be measured by the discharge voltage drop from fully charged to threshold (both the fully charged and threshold levels vary by battery chemistry) at operating temperature. The battery pack charge and discharge history (which includes all past charging and discharging events with parameters such as battery cell temperature, charge voltage, discharge current and age since construction for the battery pack and each cell) is known and stored in each battery pack's persistent memory as information aggregated from prior uploads received during charging sessions at the administration center.

The aging battery pack Daga score is compared to a threshold each charging session. If the Daga score falls below a first threshold value, the battery pack may be derated and offered for lower capacity or lower voltage uses. The derating may include a recharge rate ceiling. If the Daga score falls below a second threshold, the battery pack is decommissioned for safety purposes.

Until a derating threshold is reached, the battery pack will compensate for cell voltage declines using the internal mechanisms which include, battery cell reconfiguration, DC/DC conversion, and/or adjustable reactance.

SCENARIO 5: Battery Charge Depletion

In normal use, a battery cell output voltage will decrease as the cell's electron reserve is depleted. For instance, an example Lithium battery cell's output voltage fades from a maximum, fully charged, voltage of 4.2 volts to a floor of 3.0 volts before being taken offline by the Battery Pack Management Controller (BPMC) 1302. Using the contactless swappable battery pack, the output voltage may be controlled at a steady 3.5 volts throughout the period of use or before the 3.0 volt-per-cell voltage safety floor is reached.

Logistics Chain for Fulfillment

FIG. 14

FIG. 14 illustrates an exemplary distribution network for the transport, production, warehousing, pre-positioning, storage, charging, exchange, and replenishing of a delivery system for contactless swappable battery units. Production 1401 allows new contactless swappable battery packs to enter the market. Production 1401 also may include the refurbishment and repair of existing contactless swappable battery packs to bring them back to the marketplace. Uncharged battery packs may be shipped to a charging facility 1402, where they are stored in a warehouse 1403 charged or uncharged, or moved uncharged to a warehouse with charging capability 1404 to prepare the battery pack for use. Production 1401 may be a single facility or multiple facilities.

Charging facilities 1402 allow the charging of a contactless swappable battery packs. Charging facilities 1402 may be located at the production sites, within warehouses, within transport depots, or at sites where electrical power is cheap and/or plentiful. Alternately, charging facilities 1402 may be located where adequate power is available and the combination of electricity costs and transport costs are low. Charging facilities 1402 associated with particular power generation (e.g., windfarms, hydro-electric power) may allow for battery packs to be labeled with electrical load origin.

Warehousing 1403 can be used to store charged, uncharged or partially charged battery packs. Power Warehouses with charging facilities 1404 can be used to keep battery packs ready for deployment via charge level monitoring and topping off either periodically or immediately prior to release.

Transport of new and refurbished battery packs between non geographically co-located sites in the distribution network 1405 is accomplished via a shipping network 1406. The distribution network 1405 and shipping network 1406 coexist with and supply the in-use segment 1407 of the servicing network 1408. The servicing network 1408 contains the depots for charging, storage, testing and loading capabilities. The in-use segment 1407 contains the battery packs currently installed in vehicles, factories, hospitals, off-grid installations, and other battery powered equipment.

A full depot 1409 can store battery packs, charge them, and exchange deplete packs for fresh packs using handling equipment. In some cases, the full depot may be fully automated with robotic handling equipment. A management unit (MU) with wired/wireless network interconnection is expected for each full depot 1409. The full depot 1409 can be sited anywhere, but preferentially near transport nexus where plentiful power is available.

An exchange depot 1405 acts as an exchange point for depleted battery packs. Warehousing and loading and unloading equipment is available at an exchange depot 1405. The exchange depot 1405 relies on transport of charged battery packs (for instance via barge, rail, or roadway) and backhauling of depleted battery packs for replenishment of the local warehouse.

A charging station 1407 allows in-situ recharging of battery packs without the dismounting and replacement of the depleted battery packs. Charging stations may be co-located with full depots 1409. Specialized mobile or portable charging cradles allow for contactless charging.

System for Distribution, Planning, and Recharging

The Management Unit (MU) is a specialized Assets Management System (ASM), for instance one based on the IBM Maximo Enterprise Management System customized for the multi-dimensional aspects of the Contactless Swappable Battery (CSB) system (which include not only serial number asset tracking, but also the current location and use of the CSB, but also the state of charge and battery pack health) with added security, multi-party access control, redundant databases and Geographical Information Systems (GIS).

The MU may be offered as a hosted (cloud-based) system or as an on-premise hardware and software system, based on generic high-availability computing platforms sized to fit processing and storage needs. The MU may be used to provide logistic management and control functions for the warehousing, transportation management, and shipping to the past, current, and planned locations for individual (or groupings) of contactless swappable battery packs. The MU provides a platform for storage and analysis of battery pack information such as battery pack model and serial numbers, current charge state, power storage and delivery capability rating, cooling setup available, voltage and current capability, age, and estimated service lifespan.

The MU also contains charger information including wait times, usage rate, in-use indicator, charging power level, physical sizes, and cooling arrangement. The MU may also contain the source of electrical power for each charger, for instance the customer may desire all power from renewable or 'carbon-neutral' sources so battery packs may be so charged and labeled both in the MU and in internal memory.

The MU may be located at the warehouse or depot level, or deployed to serve a regional, national, or continental area in an administration center. MUs can be configured in distributed clusters or in hierarchal fashion to cover broadening geographic service area or high-use service areas.

The MU, or an MU cluster, may further contain a programmable expert system that uses machine learning techniques. The expert system may be used for pre-positioning, optimization of battery pack distribution, daily, monthly, seasonal or annual trending, out-of-stock predictions, out-of-stock warnings, out-of-stock redirection corrections, price of electricity and transport arbitrage, contracted delivery levels, partial charge evaluation versus charging time based on available charging resources (e.g., number of charging cradles at a depot or in a geographic area, availability of warehoused partially charged units, units available for shipment with time-of-arrival forecasting).

Customers of the battery service may connect to the MU to see inventory and place reservations for battery packs along intended routes. Fully automated vehicles can also make use of this service offered by the MU.

Designated Management Unit(s) provide the source and change control for encryption, authentication, and access controls via the data network. The designated MU collects telemetry and alarm data from battery packs under its oversight from communications equipped charging cradles, discharging cradles, recharging stations, or from the battery pack itself if equipped with long-range communications (e.g., via a commercial cellular wireless network).

The MU is also the control access point for battery pack diagnostics and performs the collection, display and storage of battery pack or charging cradle alarming. The MU may be used for controlling power distribution with the addition of accounting logic, transport costs, and pricing costs. Using electrical prices, transportation costs, inventory of battery packs and trend data (including contracted service levels and reservations), the MU allows for control and analysis of the operations for charging, transport and re-positioning of battery inventory to take advantage of local or regional electricity costs.

FIG. 15

FIG. 15 illustrates an exemplary network for the monitoring and control of physical and informational assets in a battery exchange network. In particular, FIG. 15 illustrates a charging and exchange network using a hierarchal architecture for the command and control of contactless swappable battery related (e.g., battery units, chargers) physical assets and battery related data and battery generated telemetry data.

As illustrated in FIG. 15, the administration center 1501 contains the MU software implemented on distinct hardware platforms for the purposes of illustration. Actual MU data storage and software could be run on distributed cloud networks or redundant computing hardware systems. The administration center 1501 can be implemented by each owner, or by each production center and may be implemented as a single site operation or distributed among multiple redundant sites.

In the administration center 1501, staff 1502 manage the flow of information via consoles 1503. In this configuration, all information storage is accomplished by a database 1504. This contactless swappable battery packs database 1504 contains partitioned information on the users, owners, current or last-known geographic location, current or last-known state-of-charge, battery pack health, and encryption keys. Billing may be done by the administration center 1501 or locally with prompt reporting to the administration center 1501 to manage inventories. The database 1504 also contains the geographic locations of every charger, power generation facilities, and warehouse depots as well as generic geographic mapping information and transport network information. In this configuration, the administration center 1501 uses a secure internal local area data network 1505 to protect user, battery pack, and owner information.

The telemetry server 1506 processes information about the use and health of the battery pack stored in the database 1504. Use and health information is developed by the sensors on and within the battery pack and reported as telemetry nominally when the battery pack is charging, and data connectivity is performed through the battery pack charger/charging cradle. The location, condition, usage, and cryptographic identity for each charger is also uploaded to the database 1504 via the telemetry server 1506.

The security server 1507 generates and maintains the encryption keys necessary to secure and authenticate each battery pack and battery charger under control of the administration center 1501.

The inventory server 1508 not only keeps track of all battery packs under management of the administration center 1501, both in use and warehoused, but also enables user reservation and forecasting of need. This forecast can be used to pre-position battery units for individual users, but also determine trends based on seasonal, calendar, or time-of-day battery unit exchanges and use from both the battery pack perspective as well as the user's or user's groups perspectives. The inventory server 1508 contains a Geographic Information Server (GIS) used to store, visualize, analyze, and interpret geographic data related to inventory as stored as geospatial data in the database 1504.

In this example, a wired datalink 1509 provides data interconnection via encrypted virtual private networking (VPN) between the administration center 1501 and all other sites using a packet data network 1510 (e.g., the internet).

Connected sites 1514 may include a local secure LAN 1515. Connected sites 1514 will nominally house a local inventory server 1516 and may include an operator terminal 1517 for local queries and data entry and a local (store and forward) telemetry server 1518.

From the packet data network 1510 (and using VPN tunneling for security) a wired datalink 1511 may be used to access wide-area wireless terrestrial communication networks 1512 (e.g., a cellular network).

Also using a data interconnection 1513 to the public or private data switching network (e.g., the internet) 1510, the connected MU site 1514 may reside at a depot, warehouse, repair facility, or exchange site. At these connected MU sites 1514, both the local inventory server 1516 and local telemetry server 1518 may exchange information with the administration center 1501 via the secure (VPN) data channel over the local wired connection 1513. Workers at operator terminal 1517 using the secure local network 1515 may communicate with both the internal resources and external administration center 1501. The secure local area network 1515 also may be used to provide data access to the local associated chargers or storage facilities as needed.

A remote site 1519 can be emplaced at facilities without sufficient wired data capability. In such an environment, a long-range wireless connection 1520 (e.g., a wireless system such as point-to-point microwave or a public (or private) cellular data network) provides connectivity a via secure internal network 1521 to the local administration system 1522 as well as to (in this example) the combined inventory and telemetry server 1523. A local wireless LAN 1524 provides local connectivity between the secure local network 1521 and dismounted battery packs (not shown) held in storage at the remote site 1519.

One example of such a remote site 1519 is at an exchange-only depot with no (or insufficient, or expensive) charging power available, and thus no charge cradles are equipped at the site.

Inventory information on the supply of ready stocks of battery packs, warehoused depleted battery packs, as well as arrival times of recharged or new battery pack stocks at the remote site 1519 will be maintained by a local inventory server 1522.

A secure wireless local area network 1525 may be used for connection to mobile devices 1535 requesting local inventory or status information.

In addition, wireless remote management terminals 1526 may connect to the administration center 1501 via secure wired connections 1528 and radio messaging 1530 and via satellite ground stations 1527 and orbital satellites 1529. Depending on permission levels, these remote management terminals 1526 may request recharging service, request inventory levels at allowed sites, reserve and pre-provision battery packs.

The remote management terminals 1526 also may be used to determine the location of any battery pack or charger in the network via the administration center database 1504 and GIS capabilities.

A secured wired connection 1528 is supplied to support on-route and mobile terminals that communicate with a continental or global satellite dish network 1527. Using a wired datalink connection 1528 with a continental or global satellite dish network 1527 with satellite constellation 1529, radio messaging 1530 can be used to connect with a variety of devices including truck Mobile Data Terminals 1531, satellite uplink mobiles 1532, data tablets 1533 and satellite radio equipped computers 1534. As with the wired management terminal 1526, these devices can request services and battery pack status (dependent on permission levels).

CONCLUSION

Those skilled in the art will appreciate that while the disclosure contained herein pertains to the provision of electrical power to vehicles, it should be understood that this is only one of many possible applications, and other configurations including non-vehicular applications are possible. For example, those skilled in the art will appreciate that there are numerous applications of providing batteries in non-vehicle inductive charging applications such as portable consumer electronic device chargers, such as those (e.g., PowerMat™) used to charge toothbrushes, cellular telephones, and other devices. Large capacity, but still portable, contactless swappable battery packs can be moved, by rail for example, to areas hit by a natural or manmade disaster for crucial electrically powered services. Accordingly, these and other such applications are included within the scope of the following claims.

What is claimed is:

1. A battery system comprising:
a battery unit comprising an arrangement of serially connected battery cells in a fixed number of banks of battery cells to deliver a set voltage and current;
a sealable case adapted to house the battery unit and adapted to fit into a battery unit socket of a vehicle, the battery unit socket adapted for loading and unloading of battery units into the vehicle; and
at least one wireless power transmission coupler connected to the battery unit and disposed within the sealable case, the at least one wireless power transmission coupler disposed with respect to at least one face of the sealable case to enable magnetic inductive signaling for charging, discharging, and communication between the battery unit and a wireless transmission coupler of the vehicle, whereby the at least one wireless power transmission coupler geometrically aligns with the wireless transmission coupler of the vehicle for wireless power transfer.

2. A battery system as in claim 1, further comprising a switching matrix that selectively connects the battery cells in at least one of a serial or parallel fashion.

3. A battery system as in claim 2, further comprising a DC/DC converter that adjusts and output voltage level of the battery unit to the set voltage.

4. A battery system as in claim 1, wherein each battery cell comprises a chemical cell, a capacitive cell, a fuel cell, or a hybrid array of at least two of a chemical cell, a capacitive cell, and a fuel cell.

5. A battery system as in claim 1, further comprising an inductive communications link interface within the sealable case, the inductive communications link interface enabling wireless communications between the battery unit and at least one of a discharge station and a charging station.

6. A battery system as in claim 1, further comprising a communications controller within the sealable case, the communications controller preventing communications access to the battery unit without authentication using an encryption key.

7. A battery management controller comprising:
a rack comprising a plurality of slots for holding a plurality of contactless battery systems comprising a sealable case, a battery unit comprising battery cells disposed within the sealable case, and at least one wireless power transmission coupler connected to the battery unit and disposed within the sealable case, the at least one wireless power transmission coupler disposed with respect to at least one face of the sealable case to enable magnetic inductive signaling for charging, discharging, and communication with the battery unit, each slot of the rack comprising an inductive communications interface comprising transmit and receive antenna that communicate bidirectionally with at least one antenna of a contactless battery system provided in said each slot; and
a battery management system that communicates bidirectionally with the inductive communications interface of each slot and with electrically powered equipment to control charging of the electrically powered equipment.

8. A battery management controller as in claim 7, wherein the battery management system initiates interrogation messaging of at least one of the contactless battery systems, the interrogation messaging comprising at least one of an identity request, an authentication challenge, or a health, status, and capabilities request.

9. A battery management controller as in claim 8, wherein an interrogated contactless battery system responds to an interrogation message by providing at least one of stored values, calculated values, or initiate a built-in test to determine health, status, and capabilities of battery cells of the interrogated contactless battery system.

10. A battery management controller as in claim 7, wherein the battery management system responds to a request for power by the electrically powered equipment by commanding at least one of the contactless battery systems to deliver a portion of the requested power.

11. A battery management controller as in claim 10, wherein the battery management system provides a response to the electrically powered equipment when the requested power is available, the response including at least one of a state-of-charge of the of the at least one of the contactless battery systems, a run-time estimate, or a power capacity estimate.

12. A battery management controller as in claim 10, wherein the battery management system responds to the request for power by reconfiguring connectivity of battery cells of at least one of the contactless battery systems based on a state of charge of the battery cells to deliver the requested power.

13. A battery management controller as in claim 12, wherein at least one contactless battery system compensates for a voltage decline by reconfiguring the connectivity of the battery cells, providing DC/DC conversion, or by providing adjustable reactance.

14. A contactless battery distribution system for distributing a plurality of contactless battery systems, comprising:
  a plurality of depots adapted to at least one of store, charge, or exchange depleted contactless battery systems with charged contactless battery systems, each contactless battery system comprising a sealable case, a battery unit comprising at least one battery cell disposed within the sealable case, and at least one wireless power transmission coupler connected to the battery unit and disposed within the sealable case, the at least one wireless power transmission coupler disposed with respect to at least one face of the sealable case to enable magnetic inductive signaling for charging, discharging, and communication with the battery unit; and
  at least one management unit associated with the plurality of depots, the at least one management unit providing logistic management and control functions for warehousing, transportation management, and shipping for the plurality of contactless battery systems,
  wherein the at least one management unit stores and analyzes contactless battery system information including at least one of battery model and serial numbers, battery charge state, power storage and delivery capability rating, available cooling setup, voltage and current capability, age, or estimated service lifespan, and
  wherein the at least one management unit stores charger information including at least one of wait time, usage rate, in-use indicator, charging power level, physical size, a source of electrical power, or cooling arrangement for each charger.

15. A contactless battery distribution system as in claim 14, wherein the at least one management unit comprises a programmable expert system that uses machine learning techniques to at least one of pre-position contactless battery systems for distribution, optimize distribution of contactless battery systems, provide trending analysis, provide out-of-stock predictions or warnings, provide out-of-stock redirection corrections, arbitrage a price of electricity and transport, contract delivery levels, or evaluate partial charge versus charging time based on available charging resources.

16. A contactless battery distribution system as in claim 14, wherein the at least one management unit enables customers to reserve contactless battery systems along a travel route or to review available inventory of contactless battery systems at a depot.

17. A contactless battery distribution system as in claim 14, further comprising a data network, wherein the at least one management unit provides source and change control for at least one of encryption, authentication, or access controls for the contactless battery systems via the data network.

18. A contactless battery distribution system as in claim 17, wherein the at least one management unit collects telemetry and alarm data from the contactless battery systems via the data network.

19. A contactless battery distribution system as in claim 18, wherein the at least one management unit collects contactless battery systems diagnostics data and collects, displays, and stores the alarm data.

20. A contactless battery distribution system as in claim 14, wherein the at least one management unit controls power distribution based on analysis of operation for at least one of charging, transporting, or re-positioning inventory of contactless battery systems in accordance with electricity costs.

21. A contactless battery distribution system as in claim 14, further comprising an inventory server that keeps track of locations of contactless battery systems, user reservations of contactless battery systems, and needs forecasting for contactless battery systems at respective depots for pre-positioning contactless battery systems.

* * * * *